(12) United States Patent
Cavalcante

(10) Patent No.: US 10,534,586 B2
(45) Date of Patent: *Jan. 14, 2020

(54) METHOD, SYSTEM AND APPARATUS FOR VISUAL PROGRAMMING OF INTERACTION WORKFLOWS FOR OMNI-CHANNEL CUSTOMER CONTACT CENTERS WITH INTEGRATED CUSTOMER RELATIONSHIP MANAGEMENT

(71) Applicant: OpenMethods, Inc., Los Angeles, CA (US)

(72) Inventor: Fabio Vital Cavalcante, Bothell, WA (US)

(73) Assignee: OpenMethods, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,083

(22) Filed: Oct. 16, 2018

(65) Prior Publication Data

US 2019/0050206 A1 Feb. 14, 2019

Related U.S. Application Data

(63) Continuation of application No. 15/143,561, filed on Apr. 30, 2016, now Pat. No. 10,101,976.

(Continued)

(51) Int. Cl.
*G06F 8/34* (2018.01)
*H04M 3/51* (2006.01)
(Continued)

(52) U.S. Cl.
CPC .............. *G06F 8/34* (2013.01); *G06F 3/0486* (2013.01); *G06F 8/38* (2013.01); *G06Q 30/01* (2013.01);
(Continued)

(58) Field of Classification Search
CPC ............. G06F 11/3664; G06F 11/3684; G06F 3/0486; G06F 8/30; G06F 8/34;
(Continued)

(56) References Cited

U.S. PATENT DOCUMENTS

| 8,838,788 B2 * | 9/2014 | Pearce ................... G06Q 30/00 709/224 |
| 9,065,915 B1 | 6/2015 | Lillard et al. |

(Continued)

OTHER PUBLICATIONS

Openmethods, "The Omnichannel Playbook for Oracle Service Cloud," Apr. 2016, OpenMethods.com, pp. 1-9; <http://openmethods.com/assets/omnichannel-playbook-042516.pdf>.

(Continued)

*Primary Examiner* — Marina Lee
(74) *Attorney, Agent, or Firm* — Lapple Ubell IP Law, LLP; Matthew C. Lapple

(57) ABSTRACT

A method, apparatus and system for achieving visual programming of interaction workflows for customer contact centers which eliminates the need for skilled computer telephony interaction programmers to program the screen pops and workflows that are presented to live-agent customer service representatives in a contact center. Further, the disclosed method and apparatus enables integration of contact information from omni-channel systems, as well as customer relationship management ("CRM") data, data collected from interactive voice response ("IVR") systems, and data pulled from third-party databases, into the screen pops and workflows in a way that is agnostic as to the type or protocol of the PBX switch, the IVR system and the CRM system utilized by a particular call center, by facilitating a level of abstraction and data flow between and among these components.

39 Claims, 39 Drawing Sheets

Related U.S. Application Data

(60) Provisional application No. 62/155,058, filed on Apr. 30, 2015.

(51) Int. Cl.

| | | |
|---|---|---|
| *G06F 3/0486* | (2013.01) | |
| *G06F 8/38* | (2018.01) | |
| *G06Q 30/00* | (2012.01) | |
| *G06F 8/30* | (2018.01) | |
| *G06F 11/36* | (2006.01) | |
| *H04M 7/00* | (2006.01) | |

(52) U.S. Cl.
CPC ....... *H04M 3/5166* (2013.01); *H04M 3/5183* (2013.01); *H04M 7/0021* (2013.01); *H04M 7/0048* (2013.01); *H04M 7/0054* (2013.01); *G06F 8/30* (2013.01); *G06F 11/3664* (2013.01); *G06F 11/3684* (2013.01); *H04M 2201/42* (2013.01)

(58) Field of Classification Search
CPC ........ G06F 8/38; G06Q 30/01; H04M 3/5166; H04M 3/5183; H04M 7/0048; H04M 7/0054; H04M 2201/42; H04M 7/0021
USPC .................................................. 717/100–135
See application file for complete search history.

(56) References Cited

U.S. PATENT DOCUMENTS

| | | | |
|---|---|---|---|
| 9,106,736 B1 | 8/2015 | Slovacek | |
| 9,112,974 B1 | 8/2015 | Wilsie et al. | |
| 9,348,563 B1 | 5/2016 | Xue et al. | |
| 9,609,102 B1 | 3/2017 | Cooper et al. | |
| 9,641,685 B2 * | 5/2017 | Lintner | H04L 67/24 |
| 9,871,923 B2 * | 1/2018 | Hickey | H04M 3/523 |
| 10,101,976 B2 * | 10/2018 | Cavalcante | G06F 8/34 |
| 10,235,649 B1 * | 3/2019 | Marimuthu | G06Q 10/0637 |
| 2006/0074737 A1 | 4/2006 | Shukla et al. | |
| 2009/0132220 A1 | 5/2009 | Chakraborty et al. | |
| 2011/0145783 A1 | 6/2011 | Seshan et al. | |
| 2011/0231812 A1 | 9/2011 | Maine | |
| 2011/0289515 A1 | 11/2011 | Hung et al. | |
| 2013/0077768 A1 * | 3/2013 | Pearce | G06Q 30/00 379/88.01 |
| 2013/0290924 A1 | 10/2013 | March et al. | |
| 2014/0140495 A1 | 5/2014 | Ristock et al. | |
| 2014/0177819 A1 * | 6/2014 | Vymenets | H04M 3/5183 379/265.09 |
| 2014/0177821 A1 | 6/2014 | Ristock et al. | |
| 2014/0181676 A1 | 6/2014 | Samborskyy et al. | |
| 2016/0162232 A1 | 6/2016 | Morita et al. | |
| 2016/0202958 A1 | 7/2016 | Zabel et al. | |
| 2016/0321041 A1 * | 11/2016 | Cavalcante | G06F 8/34 |
| 2017/0139724 A1 | 5/2017 | Rider et al. | |
| 2017/0147296 A1 | 5/2017 | Kumar et al. | |
| 2017/0235551 A1 | 8/2017 | Martin et al. | |
| 2017/0236067 A1 | 8/2017 | Tjiong | |
| 2018/0091652 A1 * | 3/2018 | Lakdawala | H04M 3/5175 |
| 2018/0234545 A1 * | 8/2018 | Barak | H04M 3/527 |
| 2019/0050206 A1 * | 2/2019 | Cavalcante | G06F 8/34 |

OTHER PUBLICATIONS

Federico et al., "A Nested Workflow Model for Visual Analytics Design and Validation," ACM, Oct. 2016, pp. 1-8; <https://dl.acm.org/citation.cfm?id=2993915>.

Alotaibiet et al., "Fostering the user interface acceptance in customer relationship management," IEEE, Apr. 2012, pp. 796-801; <https://ieeexplore.ieee.org/stamp/stamp.jsp?tp=&arnumber=6209088>.

* cited by examiner

FIG. 2

```
namespace OpenMethods.HttpScreenPopListener.Example
{
    public class HttpScreenPopListener
    {
        private HttpListener _listener;

public event EventHandler<ScreenPopEventArgs> ScreenPop;

public HttpScreenPopListener()
        {
        } public void StartListening(string address)
        {
            _listener = new HttpListener();
            _listener.Prefixes.Add(address);
            _listener.Start();
            processRequests();
        } private void processRequests()
        {
            while (_listener.IsListening)
            {
                try
                {
                    processRequest(_listener.GetContext());
                }
                catch
                {
                    break;
                }
            }
        } private void processRequest(HttpListenerContext context)
        {
            var queryString = context.Request.QueryString;

var interaction = new Interaction
            {
                Ani = getAni(),
                CallData = new Dictionary<string, string>(),
                Dnis = getDnis(),
                Type = InteractionType.Voice
            };

foreach (var queryKey in queryString.AllKeys)
            {
                interaction.CallData.Add(queryKey, queryString[queryKey]);
            } try
            {
```

FIG. 3

```
        OnScreenPop(interaction);

}
    catch
    {
    }

// set response to "200" 'success'

// if any exceptions,
    // set response to "500" 'internal failure'

// close request
} private string getAni()
{
    // technique to retrieve ANI from address
    return "ani";
} private string getDnis()
{
    // technique to retrieve DNIS from address
    return "dnis";
} private void OnScreenPop(Interaction interaction)
{
    var temp = ScreenPop;
    if (temp != null)
    {
        temp(this, new ScreenPopEventArgs(interaction));
    }
}
} public class ScreenPopEventArgs : EventArgs
{
    public ScreenPopEventArgs(Interaction interaction)
    {
        Interaction = interaction;
    } public Interaction Interaction { get; set; }
}
}
```

Standard Field          Custom Field          Custom Attribute

"Replace" parser:

.Replace(["string_to_replace","replacement_string"])

*Example:* {ANI}.Replace(["+1",""])

This will replace the common prefix +1 with an empty string, effectively removing it.

"Regular Expression" parser:

*Example:* {ANI}.Regex(["\d+"])

\d+ is a Regular Expression which will allow only digits in the ANI; in other words, it will remove anything which is not a digit from the range 0-9.

*Examples:* abc+1234567.Regex(["\d+"]) will result in 1234567.

(816)405-7394.Regex(["\d+"]) will result in 8164057394.

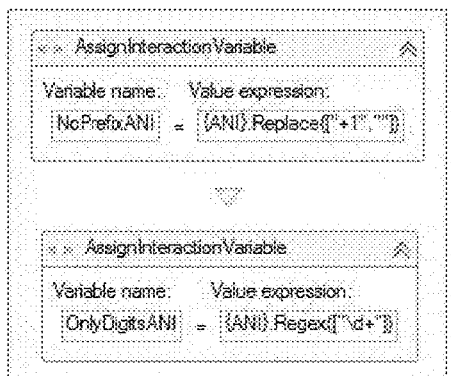

FIG. 47

METHOD, SYSTEM AND APPARATUS FOR VISUAL PROGRAMMING OF INTERACTION WORKFLOWS FOR OMNI-CHANNEL CUSTOMER CONTACT CENTERS WITH INTEGRATED CUSTOMER RELATIONSHIP MANAGEMENT

RELATED APPLICATIONS

The teachings herein constitute a continuation U.S. patent application Ser. No. 15/143,561, filed on Apr. 30, 2016, and which will be issued as U.S. Pat. No. 10,101,976 on Oct. 16, 2018, which in turn claims priority to provisional patent application No. 62/155,058, filed on Apr. 30, 2015, and the benefit of these earlier filing dates are claimed and the content thereof incorporated herein by reference as though fully set forth herein.

FIELD OF THE INVENTION

The embodiments of the described invention relate generally to methods, apparatus and systems for visual programming of voice and omni-channel interaction workflows for live-agent contact centers, which can present screen pops, create a unified and intelligent desktop experience, guide agent behavior to desired outcomes and provide behind the scenes data integration of disparate systems using abstracted interfaces to overcome the data collection and data integration requirements and idiosyncrasies of the hardware and software systems commonly used to operate contact centers.

BACKGROUND

A well-established way for businesses to provide customer service is by offering a customer service contact center. Modern contact centers typically include a telephone call center, an automated call response system, an online "chat" system, an email response system, or a combination thereof. Such contact centers typically operate with a combination of live-agents and automated systems.

Contact centers tend to have three major variables in their organization and operation. First, size and live-agent distribution can vary greatly. Contact centers can be at a centralized location with all of the live-agents working in the same building or on the same floor, or they can be decentralized, employing home-based live-agents. Contact center sizes range from a handful of live-agents to tens of thousands of live-agents. Second, contact centers can be simple and straight forward or very complex. Finally, contact centers can be either voice-only or they can be fully omni-channel deployments, enabling customer contact through, for example, telephone, online video sessions, text messaging, online chat, and email.

Existing contact center technology tends to suffer from the same set of problems and obstacles. First, contact center systems tend to operate largely in isolation and share data reluctantly and at high cost between systems. For example, CRM systems are customer relationship management platforms. The goal of the system is to track, record, store in databases, and then organize the information in a way that increases or improves customer relations. The CRM codifies the interactions between a business and its customers so that the business can maximize sales and profit using analytics to give the users as much information on where to focus their marketing and customer service to maximize revenue and decrease idle and unproductive contact with the businesses' customers. CRM software can also be used to identify and reward loyal customers over a period of time.

While many businesses have CRM systems, they are typically separate from the interaction workflow and are not automated to utilize customer data gathered from external sources. Instead, live-agent customer service representatives normally have to access separate applications or systems, outside of the interaction workflows within the CRM. This can result in customers not receiving prompt service, or not allowing customer service representatives to provide the types of customized and personalized service that CRM systems are designed to facilitate. Thus, there is a need to fully integrate CRM systems with call center systems.

Second, real-time data access is limited because information collected during customer interactions is collected and stored thru highly specialized and technical interfaces, the use of which requires a high level of knowledge and programming on how to extract data from each system type and pass it to another system type.

Traditionally computer telephony integration, also called computer-telephone integration or computer-telephone interactivity, or CTI, is a common name for any technology that allows interactions on a telephone and a computer to be integrated or coordinated. Today the term is generally used for, not only telephone calls but also Chat, SMS, Email, and other interaction types (Social, Video Chat, etc.). It is predominantly used to describe desktop-based interaction, integration or interactivity for helping users be more efficient, though it can also refer to server-based functionality such as automatic call routing.

In contact centers that provide integration between a telephone system and an agent's desktop, a screen pop is a window or dialog box that autonomously appears on the desktop, displaying information for a call simultaneously sent to that agent's telephone. The data displayed typically contains call information such as: (a) Caller ID (CID); (b) Automatic number identification (ANI); (c) Dialed Number Identification Service (DNIS); (d) Information entered from an Interactive voice response (IVR) system; and (e) extended information derived from one of the above. For example, the CTI system may be programmed to look up, in an external database, an order number the customer just entered and then display that order's information to the agent. Although prior art systems are sometimes able to provide such data extraction and passing, it is difficult and expensive to achieve, because it must be programmed by CTI programming specialists, rather than by customer service center managers who are knowledgeable about the needs of their customers and the specific information needed by live-agents in order to make the customer interaction more effective, more appealing to the customer, and shorter.

Third, the Application Programming Interfaces (API's) of each system in a contact center are unique, and require specialized knowledge to use these API's. Additionally, most current API's in the contact center environment utilize traditional program development models. In turn, this necessitates that a contact center utilize the services of a skilled Computer Telephony Integration ("CTI") programmer when new contact centers are set up, or when changes are made to systems or live-agent customer service scripts or workflows.

These workflows are typically generated, in prior art systems, using formal programming languages and are programmed by CTI programmers. The services of such programmers are costly, can be error prone, take significant amounts of time to perform and the results are often limited in functionality, flexibility and compatibility. One cause for such drawbacks is that such programmers are often primarily concerned with the technical aspects of the workflows, but have little hands-on familiarity with the day-to-day needs of a live-agent customer service representative, or the demands of contact center managers who are experienced in providing customer service. On the other hand, customer service agents, contact center managers, or CRM administrators typically have little skill or familiarity with how to write code or create a CTI integration. Therefore, to develop a single customer service work flow often requires weeks of effort, coordination, and testing between a contact center manager and a CTI programmer, thereby costing thousands or tens of thousands of dollars and slowing the implementation of new customer service interaction workflows. Thus, there is a compelling need for a method, system or apparatus to make CTI programming easier to implement, thereby allowing non-programmers who have expertise with customer service to design and implement interaction workflows quickly and efficiently in order to reduce expense and rapidly address customer demands.

Fourth, contact center systems are typically composed of a complex array of hardware and software, each of which requires specialized knowledge to operate and integrate, and each of which has its own technical challenges and idiosyncrasies. Such hardware and software elements include, for example, ACD's, PBX's, IVR's, CTI Interfaces, CRM systems, Virtual Agent systems, Social Media Channels and solutions, Chat and Email Solutions, and Video Channel Solutions. As a result, there is a need for a solution that integrates with the complex array of hardware and software, but that abstracts a user's interaction with those complex systems so that data integration and programming is simplified.

A private branch exchange (PBX) is a telephone exchange or switching system that serves a private organization and performs concentration of central office lines or trunks and provides intercommunication between a large number of telephone stations in the organization. The central office lines provide connections to the public switched telephone network and the concentration aspect of a PBX permits the shared use of these lines between all stations in the organization. The intercommunication aspect allows two or more stations to establish telephone or conferencing calls between them without using the central office equipment.

Each PBX-connected station, such as a telephone set, a fax machine, or a computer modem, is often referred to as an extension and has a designated extension telephone number that may or may not be mapped automatically to the numbering plan of the central office and the telephone number block allocated to the PBX.

Automatic number identification (ANI) is a feature of a telecommunications network for automatically determining the origination telephone number on toll calls for billing purposes. Modern ANI has two components: information digits, which identify the class of service, and the calling party billing telephone number. ANI is not related to newer caller ID services such as call display.

Dialed Number Identification Service (DNIS) is a service sold by telecommunications companies to corporate clients that lets them determine which telephone number was dialed by a customer. This is useful in determining how to answer an inbound call. The telephone company sends a DNIS number to the client phone system during the call setup. The DNIS number is typically 4 to 10 digits in length. Any DID (Direct inward dial) number will have a DNIS. This is the number sent from the central office to the PBX or key system, telling the telephone system which number was dialed.

For example, a company may have a different toll-free telephone number for each product line it sells. If a contact center is handling calls for multiple product lines, the switch that receives the call can analyze the DNIS and play an appropriate recorded greeting. A company may also use multiple toll free numbers for multilingual customer support, for which each support language is associated with a dedicated toll free number.

An automatic call distributor (ACD) or automated call distribution system, is a platform or system that distributes incoming interactions to a specific group of terminals or agents based on customer need, type, and agent skill set. It is often part of a computer telephony integration (CTI) platform.

Routing incoming interactions is the task of the ACD system. ACD systems are often found in offices that handle large volumes of incoming interactions from customers who have no need to interact with a specific person but who require assistance from any of multiple persons (e.g., customer service representatives) at the earliest opportunity.

The ACD system consists of hardware for the terminals and switches, phone lines, and software for the routing strategy. The routing strategy is a rule-based set of instructions that tells the ACD how interactions are handled inside the system. Typically this is an algorithm that determines the best available employee or employees to respond to a given interaction. To help make this match, additional data are solicited and reviewed to find out why the customer is communicating. As an example sometimes the customer's caller ID or ANI is used; more often a simple IVR is used to ascertain the reason for the call.

Originally, the ACD function was internal to the Private Branch Exchange of the company, and voice centric. However, the closed nature of these systems limited their flexibility. Later ACD systems were then designed to enable common computing devices, such as server PCs, to insert data into routing decisions and to provide external data into the routing engines to handle other communications channels. For this, generally the PBX would issue information about incoming calls to this external system and receive a direction of the call in response.

An additional function for these external routing applications is to enable CTI. This allows improved efficiency for call center agents by matching incoming phone calls with relevant data on their PC via a screen pop.

Such contact centers typically have one or more physical locations with a number of live-agents for answering and responding to the communications of customers with questions or problems. Customer service contact centers also often include an automated component, an example of which is an "interactive voice response" ("IVR") that uses pre-recorded questions and menu options to provide an initial level of customer service and to gather information from the customer about the purpose of their interaction, their account number, etc. Often, if an IVR system is unable to satisfy a caller, the caller will select menu options to speak to a live agent customer service representative.

When such a selection is made, the customer service interaction is transferred to a live agent customer service representative, either located in a contact center, or handling interactions remotely. Normally, the live agent customer service representative has a computer workstation with a display and keyboard. When the interaction is transferred to the agent, her screen is populated with a series of scripts, questions, and/or information for her to interact with and assist the customer. These are known as "screen pops." Over time, data only "screen pops" have evolved to presenting data on targeted application pages in addition to informational agent "screen pops." These are more formally known as "interaction workflows."

Fifth, because of this complex mix of elements, contact centers face a regularly changing solution matrix, in that each of these elements and solutions have a limited and planned lifecycle and are therefore prone to periodic replacement to reduce costs and enhance functionality. Such hardware and software changes commonly require reprogramming or at least modification to existing programs in order to maintain the same or similar level of functionality for the live-agent workflows. As such, there is a need for an integration solution that enables live-agent workflows to be maintained and enhanced, even as underlying hardware and software of the contact center is changed.

Sixth, business processes are constantly changing which can cause costly integration efforts between solutions to be discarded. This is sometimes as a result of continuous process improvement, and sometimes as a result of corporate mergers and acquisitions. This calls for a solution that enables simplified and efficient changes to live-agent workflows and system components.

Seventh, because of the complexity of the integrations and the dynamic environments within which contact centers exist, it is common that information about a customer that has been collected through an IVR system is not transferred with the interaction when the live-agent picks up the phone.

In prior art systems, integration and information flows between a communication platform, interaction workflow/screen pop software, automation platform, and CRM systems, is poor or nonexistent. Moreover, changing or upgrading one component of a system often makes integration and information flows between the systems unworkable or causes failures of previously integrated systems. This often results in a failure to communicate important information—including information that was previously collected during the interaction by automated means—to a live-agent customer service representative that accepts an interaction or has an interaction transferred from another agent. As such, nearly everyone who has communicated with a customer service contact center has had the unpleasant experience of entering data into an automated system (such as an account number), only to be asked to repeat the same information when their interaction is transferred to a live-agent, or a higher-tier customer service agent. Such problems reduce the quality of customer service, result in customer frustration, and prolong customer service issues, all of which result in higher costs to provide customer service.

As a result of all of these factors, the efficiency and effectiveness of how the contact center meets the needs of the customer is frequently impacted and degraded from the optimal promise of these systems. This has a direct negative impact on the customer experience and the amount of time necessary to resolve any given customer service issue.

The amount of time that a live agent customer service representative must spend in order to gather information and address the reason for a customer's contact is important for several reasons. First, if the interaction takes too long, the customer will grow frustrated, often defeating or reducing the good will that can be generated by promptly and efficiently dealing with a customer service interaction. Second, because live-agent customer service representatives are typically paid by the hour, the number of interactions that each agent can handle in an hour has a direct relationship to the expense incurred to provide contact center customer service.

Accordingly, there is a need for a system, method and apparatus that overcomes these drawbacks and disadvantages.

SUMMARY OF THE INVENTION

Described embodiments of the system, method and apparatus of the present invention comprise software for visually programming a computer to create executable interaction workflows for presentation of information and appropriate workspaces to a live-agent in a contact center environment, using a processor, a computer display and a memory storing a plurality of activities. A processor presents a visual programming environment on the computer display. The processor and the memory provide a plurality of activities for selection within the visual programming environment. Each of the plurality of activities is a software object that is stored in the memory and linked to a displayable visual symbol within the visual programming environment. Each of the plurality of activities also comprises software for performing at least one task in conjunction with a host system for the contact center, such as gathering information, handling information, handling an interrupt, executing decisional logic, or presenting a screen pop on a computer display for a live-agent. Each of the activities for handling information is linked to a listener, and that listener is software code for collecting information from a contact center system component and then passing that collected information to the respective linked activity for handling information. The software provides for a user to select a plurality of visual symbols of one or more of the activities and then dragging and dropping the selected visual symbols of one or more activities within the visual programming environment, thereby creating a visual representation of an executable interaction workflow for use by a live-agent in a contact center. The executable interaction workflow can then be saved in the memory.

The system, method and apparatus of the present invention and overcomes the drawbacks and disadvantages described above. For example, it turns screen pop logic definition from being a development task, requiring highly skilled labor and cross-departmental interaction to prepare hundreds or thousands of lines of code to implement screen pops, with their associated data and logical progression, into an administrative one, managed by the people who understand how they should happen, without requiring them to have a technical background.

The system, method and apparatus of the present invention further enables users, usually CRM administrators, to visually express screen pop logic and application vectoring based on data by offering a workflow designer interface that exposes all interaction data and metadata that may be used to drive that logic.

Additionally, because the described system, method and apparatus has full access to host system data and system components through the use of listeners, and includes a simulation environment, it has the ability to test and deploy interaction workflows immediately after they are designed, rather than through an extensive and costly testing process using the actual contact center.

Moreover, the method, system and apparatus provides for conditional interaction workflows, e.g., presenting data on appropriate application pages in addition to generating informational agent "screen pops," that are data driven and that can query and update underlying databases, trigger and present appropriate application workspaces based on data gathered, or query and update external data sources. It also can present information gathered during prior portions of a particular client contact.

As such, the method, system and apparatus of the present invention can achieve significant reductions in AHT, while improving the customer contact experience, and at the same time eliminating lengthy and costly development cycles to develop traditional screen pops.

BRIEF DESCRIPTION OF THE DRAWINGS

FIG. 1 refers to a commercially available embodiment of the present invention and accordingly uses certain trademarks. The trademark POPFLOW is a trademark of OpenMethods, Inc.

FIG. 2 shows a portion of the listing of pseudocode for an embodiment of a "listener" of the present invention.

FIG. 3 shows a continuation of the listing of pseudocode of FIG. 2.

FIG. 47 shows exemplary code and an expanded and populated interface for the AssignInteractionVariable activity for the visual programming environment of an embodiment of the present invention.

FIG. 48 refers to a commercially available embodiment of the present invention and accordingly uses certain trademarks. The trademark POPFLOW is a trademark of OpenMethods, Inc. The trademark ORACLE is a trademark of Oracle International Corporation.

DETAILED DESCRIPTION OF THE PREFERRED EMBODIMENTS

Figure 1:
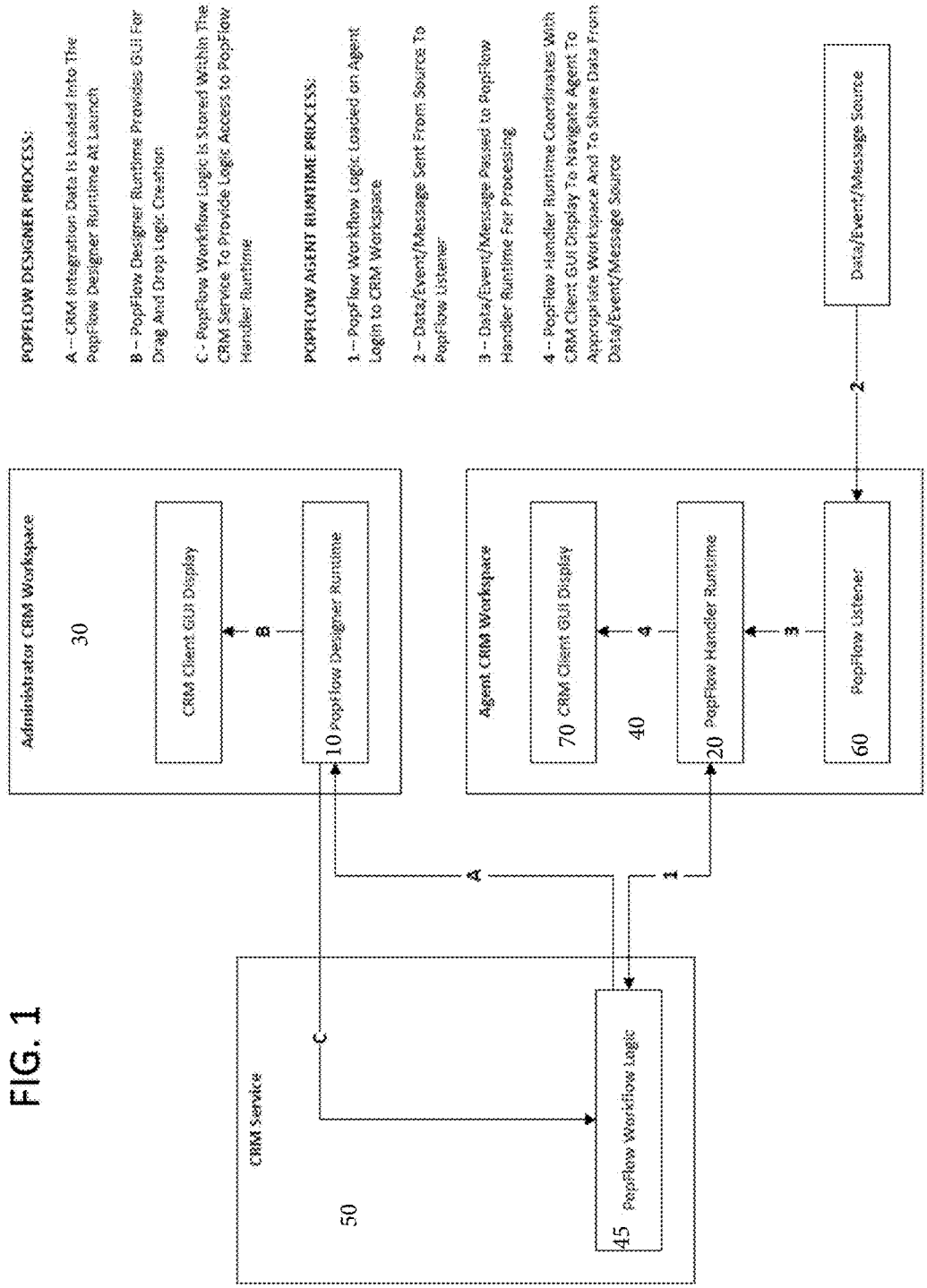
FIG. 1 shows the system for an embodiment of the present invention.

The following provides a detailed description of preferred embodiments of the method, system and apparatus of the present invention. The system, method and apparatus of the present invention, which is generally comprised of software for use in a contact center environment, facilitates the visual programming, testing and implementation of data-driven interaction workflows, workspaces and information for live-agents in omni-channel contact centers. As such, it is hereinafter referred to as contact center interaction workflow visual programming software and is sometimes referred to herein by the trademarked name of its current commercial embodiment, PopFlow™. However, neither term should be taken to limit the scope of the claimed invention.

An embodiment of the software is composed of three primary components, the PopFlow™ Listeners, the PopFlow™ Runtime, or simply the Runtime, and the PopFlow™ Designer, or simply the Designer. In combination, the Runtime and the Designer are referred to as the PopFlow™ Studio, or simply the present system.

The Designer enables users—typically CRM administrators not CTI developers—to visually express screen pop logic by offering a workflow designer interface that exposes all interaction data and metadata that may be used to drive that logic. The Designer turns creating screen pops and the logic definition from being a development task, requiring highly skilled labor and cross-departmental interaction, into an administrative task, managed by the very people who understand how screen pops should happen without requiring them to have a technical background. This eliminates the need to have the business user explain, create, and dictate the screen pop requirements to a skilled CTI developer who then builds the workflow.

The Designer includes a variety of "activities." Each activity is a software object that carries out a particular task, such as gathering information, handling information, handling interrupts, executing decisional logic, presenting an appropriate workspace on a live-agent's computer display screen based on gathered information, or presenting a screen pop to a live-agent's screen. These activities are then displayed visually in the Designer environment in order to allow a non-CTI programmer to "drag-and-drop" any needed activity into a visual logic flow of which screen pops are presented in response to any given input. Activities can either be native to one or more of the components of the existing contact center system, or customized to the user's needs.

The core responsibility of the Runtime is to execute the interaction workflow. The runtime is responsible for executing the logic of the interaction workflow using the data collected to get to the desired application pages and populating the collected data (e.g. open an incident or a contact record), thereby both saving the agent time and improving the customer experience. A separate instance of the Runtime will be implemented for each call center live-agent's display. That instance will then implement the appropriate interaction workflow for each call that is directed to the particular agent's workstation, scheduling and executing the activities that have been programmed, gathering information via the appropriate listeners and presenting screen pops as required to enable the agent to quickly and efficiently handle the caller's request.

In order to implement the data gathering and abstraction functions, novel software components, hereinafter referred to as "listeners" are provided and installed at, or on top of, each system component from which useful data might be gathered. These listeners gather data generally as it is created and forward it in near real time to the Runtime. This eliminates the need for the system component to submit such data to the interaction workflow system and creates a level of abstraction and coordination between the various components, such as the PBX, IVR and CRM. FIG. 2 shows pseudocode for an exemplar listener, in this case an HTTP listener. Embodiments of listeners include:

Multimedia Listeners—This type of listener is designed to receive information natively from a multimedia server software, such as, for example, the commercially available HARMONY™ software offered by OpenMethods.

HTTP Listeners—This type of listener is designed to receive interaction data via http protocol.

Executable Listeners—This type of listener is designed to pass information about an interaction via an executable protocol.

Scheme Based Listeners—This type of listener is designed to receive interaction data using scheme mappings passed to an executable.

DNIS Pooling Listeners—This type of listener is designed to extract interaction data from DNIS pools.

File Reading Listeners—This type of listener is designed to extract interaction data from legacy or antiquated systems by reading common file types or Call Detail Records (CDR).

Message Broker Listeners—This type of listener is designed to receive interaction data from message brokers using a service-bus type architecture.

Figure 48:
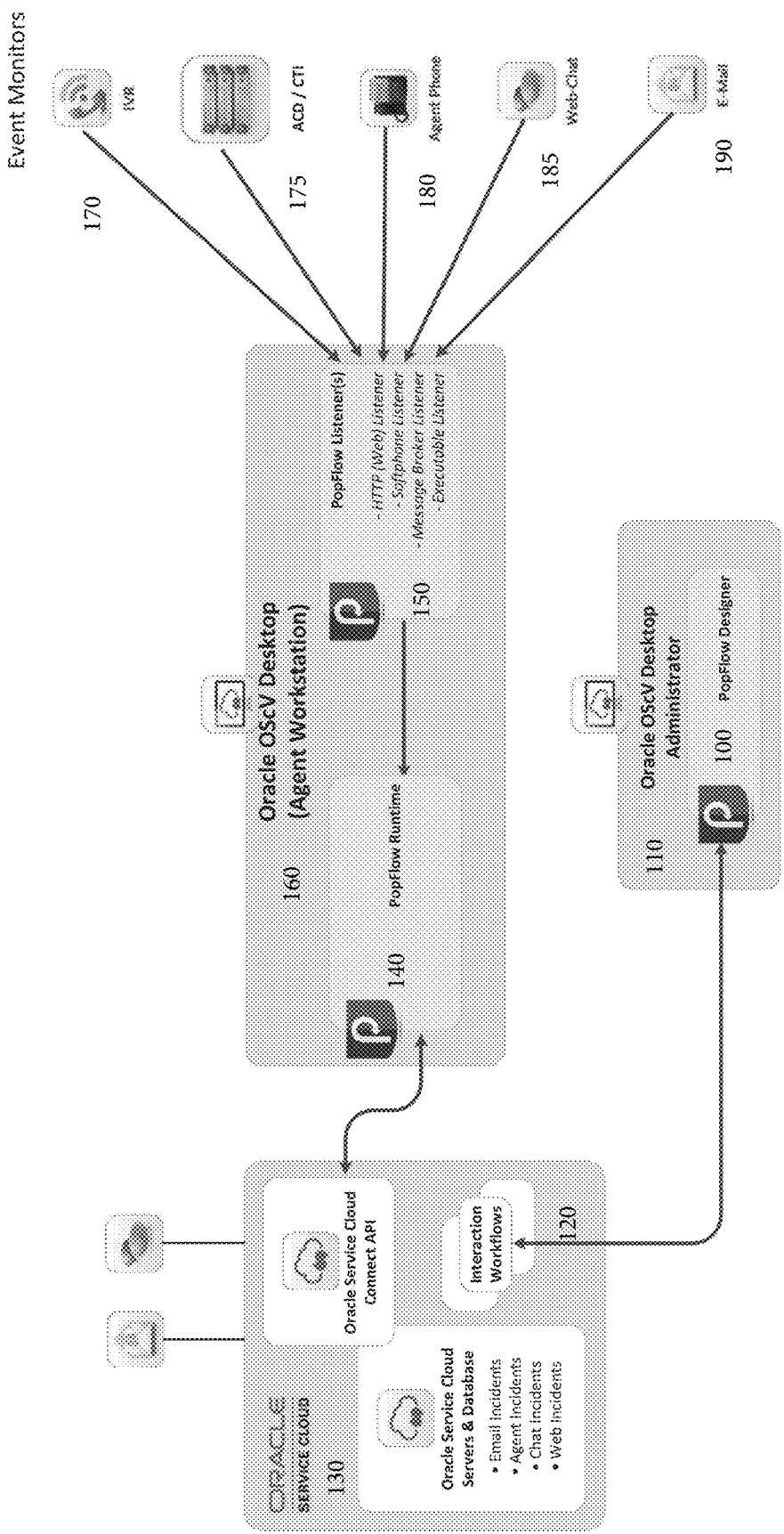
FIG. 48 shows a conceptual system diagram of an embodiment of the present invention.

In general, as shown in FIG. 1 and FIG. 48, and described further below, other system components and features include the abstraction layer, the Data Store, Extensibility Points, and the Importability and Exportability of Screen Pops. The abstraction layer allows for compartmentalizing each component so it is not dependent on the underlying platform, whether it is the CRM, the ACD or the SMS gateway. The data store is a memory to store the interaction workflows that are programmed using the Designer. The data store also serves to store the mappings and assignments of workflows, such as by agent or customer profile, the logic for assigning workflows to particular agents, and when and how particular workflows are initiated based on incoming calls and data. Extensibility points use a single, common API to call different sets of API's based upon specific technical environments. Further, the present system not only allows the design of new interaction workflows, it allows for the importation or exportation of existing workflows designed using other CTI programming methods.

With reference to FIG. 1, the conceptual structure of the system is shown, as well as the logical process carried out by the Designer and Runtime elements. As shown, the Designer 10 itself has a runtime environment. Similarly, the Runtime environment referred to above is designated as the Handler Runtime 20. The Designer 10 is resident within an administrator CRM workspace 30. Similarly, an instance of the Handler Runtime 20 is resident within the live-agent CRM workspace 40. In operation of this embodiment of the system, the Designer 10 executes three basic steps. First, the CRM integration data is loaded into the Designer 10 upon the launch of the Designer. Second, the Designer provides a GUI for a user to visually program an interaction workflow using drag-and-drop logic creation. Third, the Designer stores the created workflow 45 within a memory that is accessible to the CRM service 50.

In operation of this embodiment of the system, the Handler Runtime 20 executes four basic steps. First, the workflow logic is loaded to a live-agent's CRM workspace 40 upon login. Second, one or more listeners 60 are activated to gather data, events and messages from components of the contact center system. Third, each listener 60, upon receipt of data, an event or message, passes that information in near real time to the Handler Runtime 20 for processing according to the pre-programmed interaction workflow 45. The Handler Runtime 20 then coordinates with the CRM client GUI display 70 to navigate the live-agent to the appropriate workspace and to share information, or execute decisional logic, from the information gathered and then passed by the listeners.

With reference to FIG. 48, another conceptual structure of an embodiment of the system is shown and certain operations identified. The Designer 100 is running on the desktop of the administrator 110, to allow for visual programming of interaction workflows 120. These interaction workflows 120 are then saved into memory and are accessible to the host system 130, in this case the commercially available Oracle Service Cloud software. The Runtime 140 and a plurality of listeners 150 are instantiated on each live-agent's workstation desktop 160. The Runtime 140 connects and communicates with the host system 130 to accept assignment of particular incoming customer contacts, which may be phone calls, emails, chat requests or other known methods of client contact, as well as the respective interaction workflows 120 for responding to that incoming customer contact. Listeners 150 gather information from various contact center system components, including the IVR 170, the ACD or CTI system 175, an agent's phone (softphone) 180, web system components 185, chat system components 185, and email system components 190. The listeners 150 then each forward this gathered information in near real time to the respective Runtime 140. The Runtime 140 can then use this gathered information to drive the execution of a particular instantiation the interaction workflow 120 that has been assigned to the live-agent's desktop (not shown), by presenting appropriate workspaces, information and screen pops to the live-agent in order to facilitate resolution of the customer contact and reduce the amount of time needed by the live-agent to gather information from the customer, the CRM system, or from various third-party systems.

Turning to FIGS. 4-47, the use and operation of the interaction workflow visual programming system of the present invention is addressed.

Figure 4:
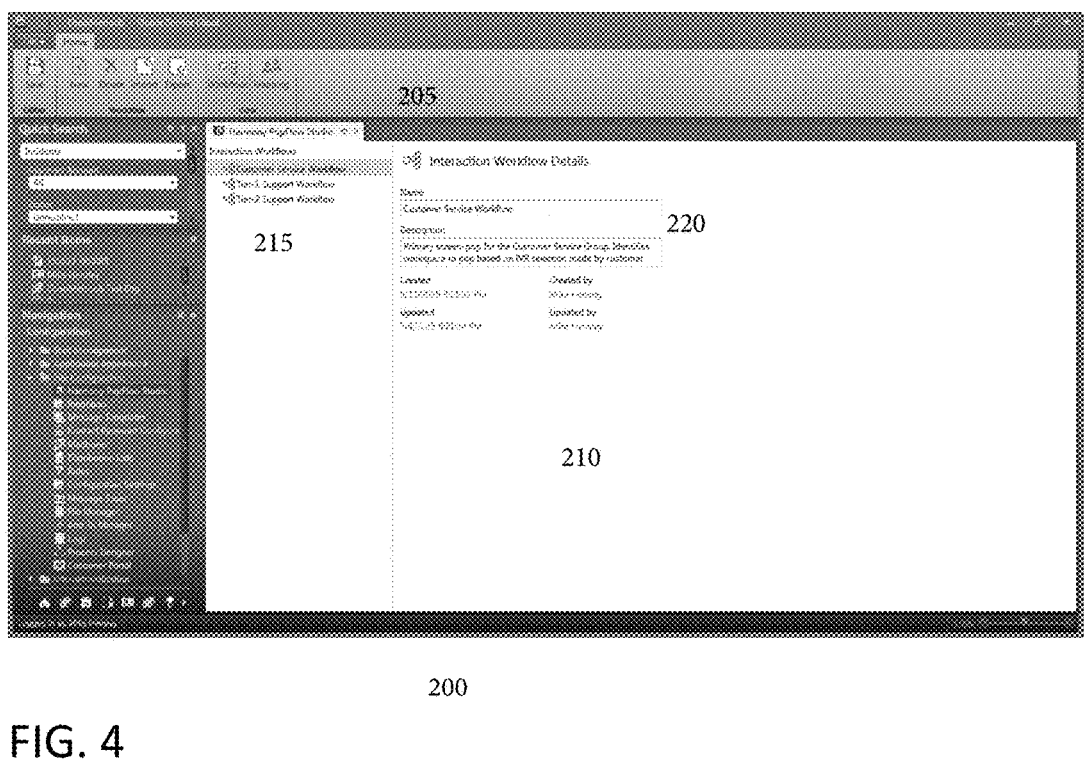
FIG. 4 shows the system homepage of a user interface for the visual programming environment of an embodiment of the present invention.

As shown in FIG. 4, when a user initially launches the interaction workflow visual programming system software, a new workspace tab will open and display the system homepage 200. The homepage 200 is split into two sections. The top section is the programming ribbon bar 205. The programming ribbon bar 205 provides the user the ability to create, edit, delete, review, and deploy visually programmed interaction workflows. By selecting the appropriate buttons in the programming ribbon bar, 205 the user controls which programming canvas section appears in the section of the homepage.

Selecting the Workflow button on the ribbon bar 205, presents the programming canvas 210, which is a visual programming environment. In this example the programming canvas 210 shows a list of available executable pre-programed interaction workflows 215 on the list panel, and the description of the selected interaction workflow 220 on the right side of the programming canvas 210.

Interaction workflows can be managed using the programming ribbon bar 205. The programming ribbon bar 205 dynamically changes based upon the user's location within the application. From the system homepage, 200 users are provided buttons in the ribbon bar 205 that allow for the management of Interaction Workflows 215.

Figure 5:
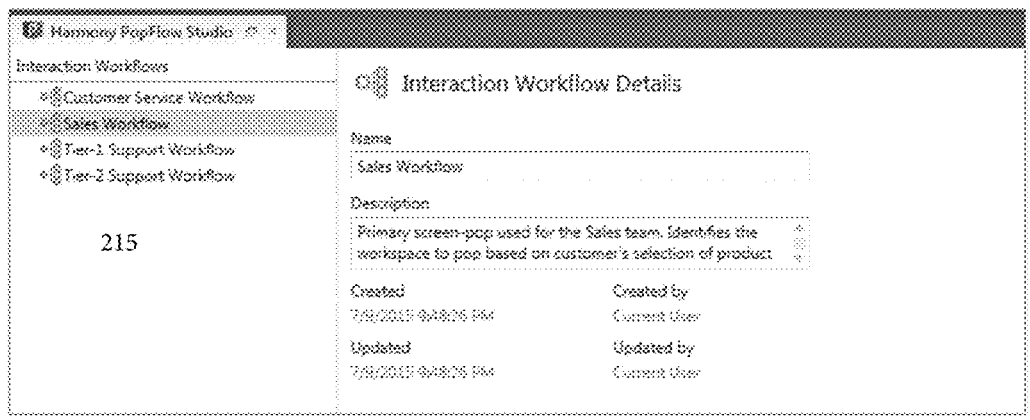
FIG. 5 shows an enlarged interaction workflow detail tab in the programming canvas of the system homepage of a user interface for the visual programming environment of an embodiment of the present invention.

To create a new Interaction Workflow, a user can click the "New" button. The system homepage 200 will display a new Interaction Workflow called "New workflow" in the Interaction Workflows list 215. In the Interaction Details window, the user can provide a name and description for the new Interaction Workflow. To open an Interaction workflow in the Interaction Workflow Designer, the user will double-click the desired Interaction Workflow. The selected Workflow will automatically open in a new Interaction Workflow Designer tab, as shown in FIG. 5, in the programming canvas 210. The new workflow can then be renamed, such as, for example, "Sales Workflow", and a description of this workflow can be entered.

Figure 6:
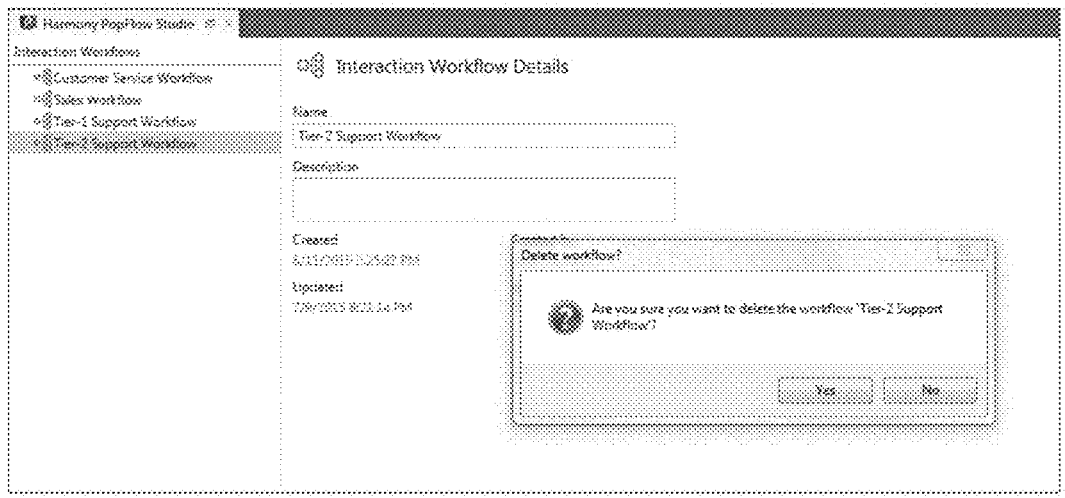
FIG. 6 shows an operation for deleting an interaction workflow using the user interface for the visual programming environment of an embodiment of the present invention.

To delete an Interaction Workflow, the user can first select the Interaction Workflow to be deleted, then click the "Delete" button as shown in FIG. 6. The system will verify the user's intention of deleting the Interaction Workflow.

Figure 7:
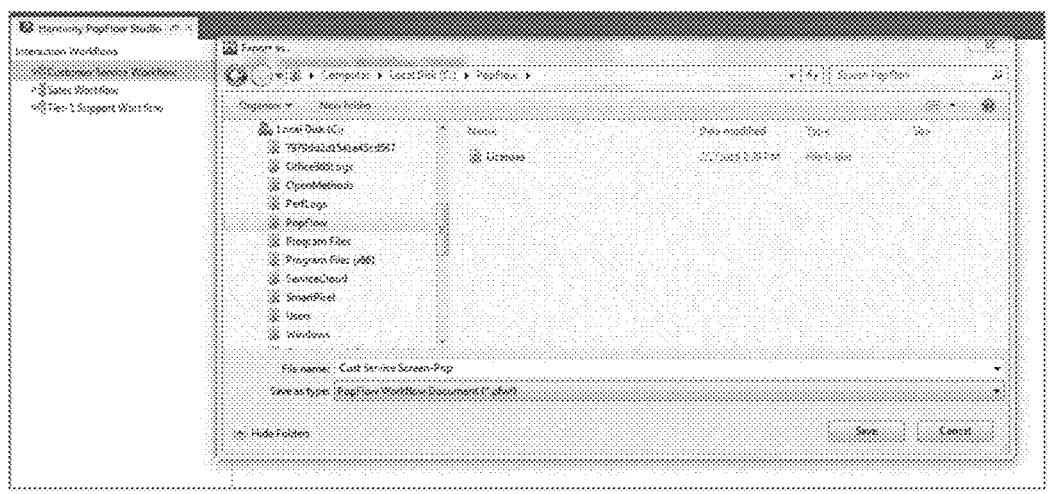
FIG. 7 shows an operation for exporting an interaction workflow using the user interface for the visual programming environment of an embodiment of the present invention.

As shown in FIG. 7, to export an Interaction Workflow, the user first selects the Interaction Workflow to be exported, then clicks the "Export" button. The user selects the desired location for exporting the Interaction Workflow, then enters the desired name for the exported file and clicks "Save." The exported Interaction Workflow will be stored in the specified location with the specified name with an extension of .pfwf, or such other extension as one of ordinary skill programs.

Figure 8:
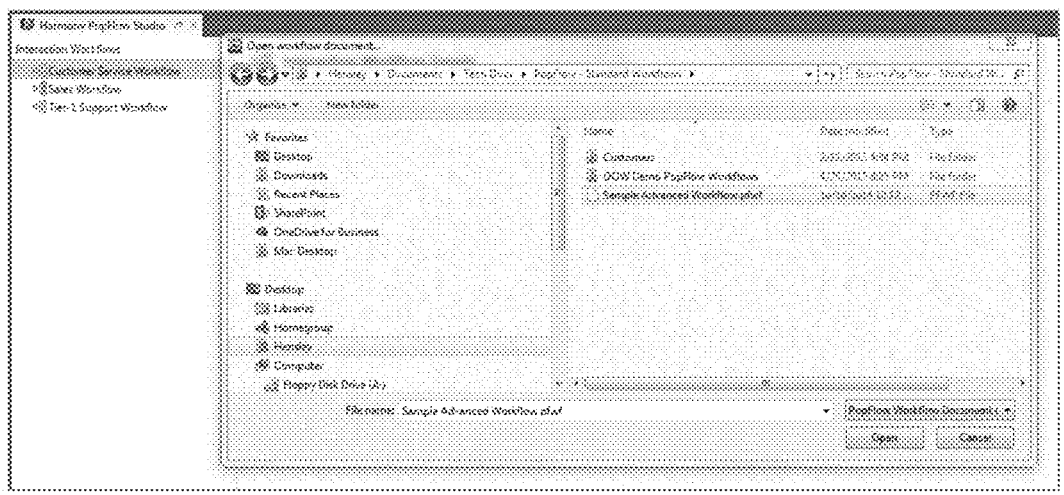
FIG. 8 shows an operation for importing an interaction workflow using the user interface for the visual programming environment of an embodiment of the present invention.

As shown in FIG. 8, to import an Interaction Workflow, the user clicks the "Import" button. From the "Open Workflow Document" window, the user navigates to the location of the Interaction Workflow file to be imported. The user selects the desired Interaction Workflow and selects "Open." The system will import the Interaction Workflow and display it in the Interaction Workflows list.

Figure 9:
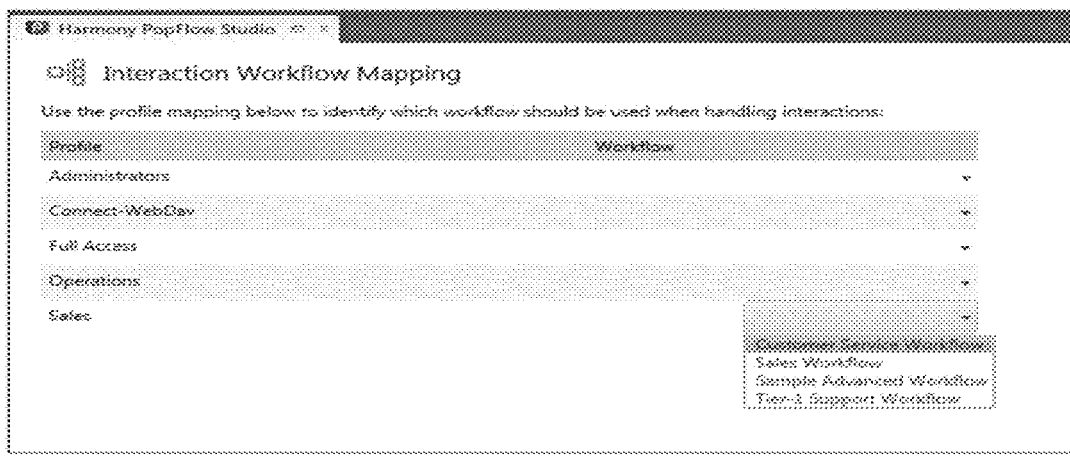
FIG. 9 shows an operation of workflow mapping to deploy a programmed interaction workflow using a user interface for the visual programming environment of an embodiment of the present invention.

As shown in FIG. 9, to assign an Interaction Workflow to a host system profile (in this case using Oracle's Service Cloud software), in other words, to deploy an Interaction Workflow as an executable file that can be used to create an instance of the Interaction Workflow on a display of a contact center agent, the user clicks the "Mapping" button. First, the user must locate the desired profile then click on the drop-down arrow in the "Workflow" column. Then the user must select the desired Interaction Workflow from the list. When complete, the user clicks the "Save" button.

Figure 10:
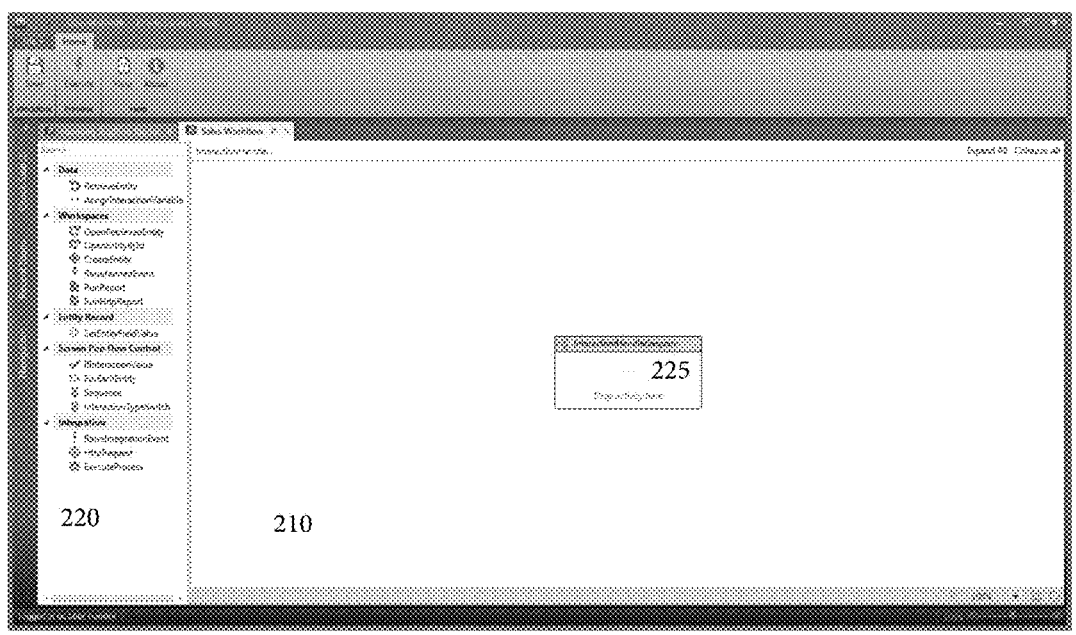
FIG. 10 shows a graphic user interface for creating new, or modifying existing, Interaction Workflows using Interaction Workflow Designer of an embodiment of the present invention.

As shown in FIG. 10, the Interaction Workflow Designer provides a graphic user interface for creating new, or modifying existing Interaction Workflows. To launch the Interaction Workflow Designer, the user must double-click the desired Interaction Workflow from the Interaction Workflow list of the system homepage. The Interaction Workflow Designer is composed of two main windows; the Activities List 220 on the left side of the Designer, and the Design Canvas 210, on the right side of the Designer. To create specific Interaction Workflow logic a user drags the name of the Activity from the Activities List 220 onto the Design Canvas 210, where it becomes a symbolic visual representation of an Activity 225. The user then can configure the Activity 225 for the desired results. Note that some Activities support the nesting of other Activities (dropping an Activity within another Activity).

Figure 11:
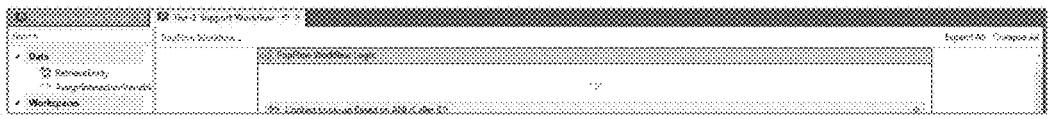
FIG. 11 shows the ability to expand or collapse an activity using a user interface for the visual programming environment of an embodiment of the present invention.

As shown in FIG. 11, a user has the ability to expand or collapse Activities, or groups of Activities, using the Expand and Collapse options located in the top, right-hand corner of the Interaction Designer and in each title bar of an Activity. To Collapse an Interaction Workflow, a user clicks "Collapse All." The Interaction Workflow will collapse to its most basic level of complexity. To expand an Interaction Workflow, a user clicks "Expand All" or "Restore." The Interaction Workflow will expand to its highest degree of detail.

Figure 12:
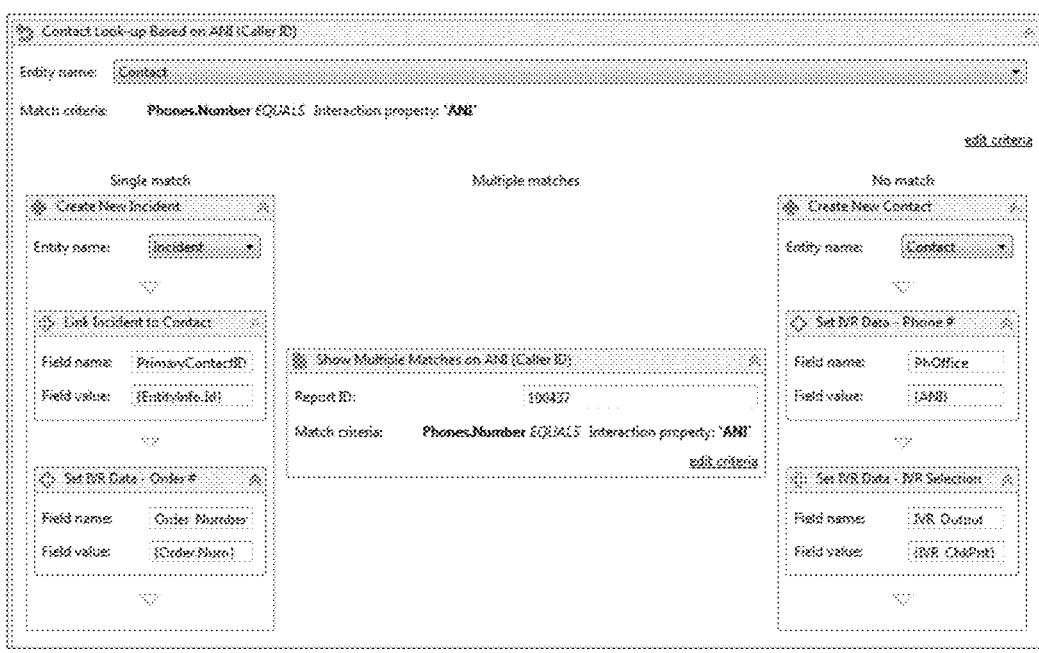
FIG. 12 shows an expanded activity for the visual programming environment of an embodiment of the present invention.

A user can also expand or collapse individual Activities by clicking on the double arrow on the top right right-hand side of the title bar of the activity. An expanded Activity is shown in FIG. 12.

Figure 13:
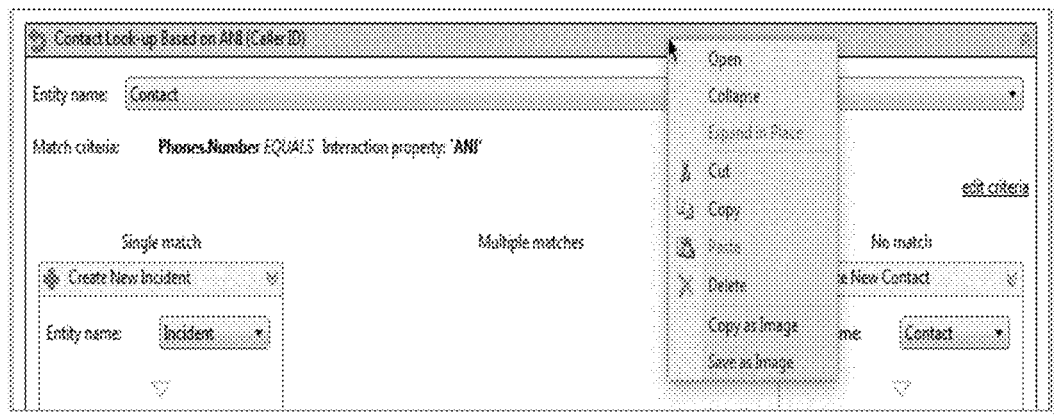
FIG. 13 shows is an Activity for "Contact Look-up Based on ANI (Caller ID) and illustrates actions that can be taken using a user interface for the visual programming environment of an embodiment of the present invention.

As shown in FIG. 13, a user can right-click the title bar of any Activity to see a context menu of available actions for working with Activities. Illustrated here is an Activity for "Contact Look-up Based on ANI (Caller ID)." Common actions include Cut, Copy, Paste and Delete for moving and re-using Activities within an Interaction Workflow. Additional options include Open, Collapse or Expand In Place. These options allow the user to focus (drill-down or expand out) on specific Activities, eliminating the clutter of other Activities in the Design Canvas. The user also has the option of copying or saving the Activity (or the entire Interaction Workflow) as an image so that images of the Activity or Interaction Workflow can be used in creating external documents. For example, this allows administrators to quickly create documents describing the screen-pop behavior for business/operational users.

Figure 14:
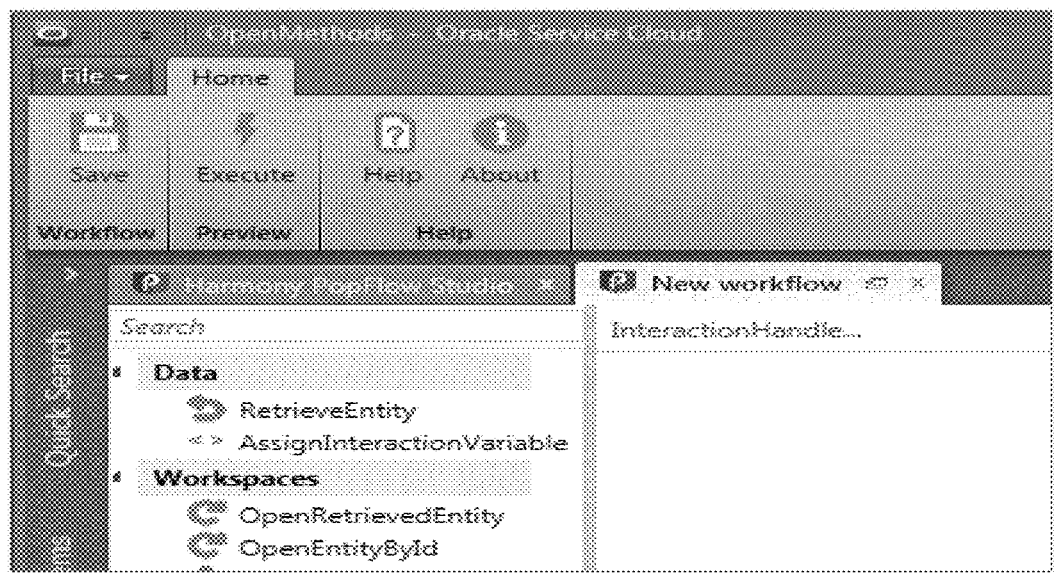
FIG. 14 shows the interface and ability to execute an open workflow at any time by clicking the "Execute" button, in the ribbon bar of the user interface for the visual programming environment of an embodiment of the present invention.

The visual programming environment of the present invention provides a test facility, i.e., a built-in simulator environment, that allows a user to see how a workflow will function in their contact center system without having to actually activate the workflow within the operational contact center system, thus saving time and resources. By utilizing this feature, a user can speed up the development process through regular simulation testing of the interaction workflow that is being programmed. This simulation environment can also be used for debugging an interaction workflow. A user is able to execute an open workflow at any time by clicking the "Execute" button, in the ribbon bar, as shown in FIG. 14.

Figure 15:
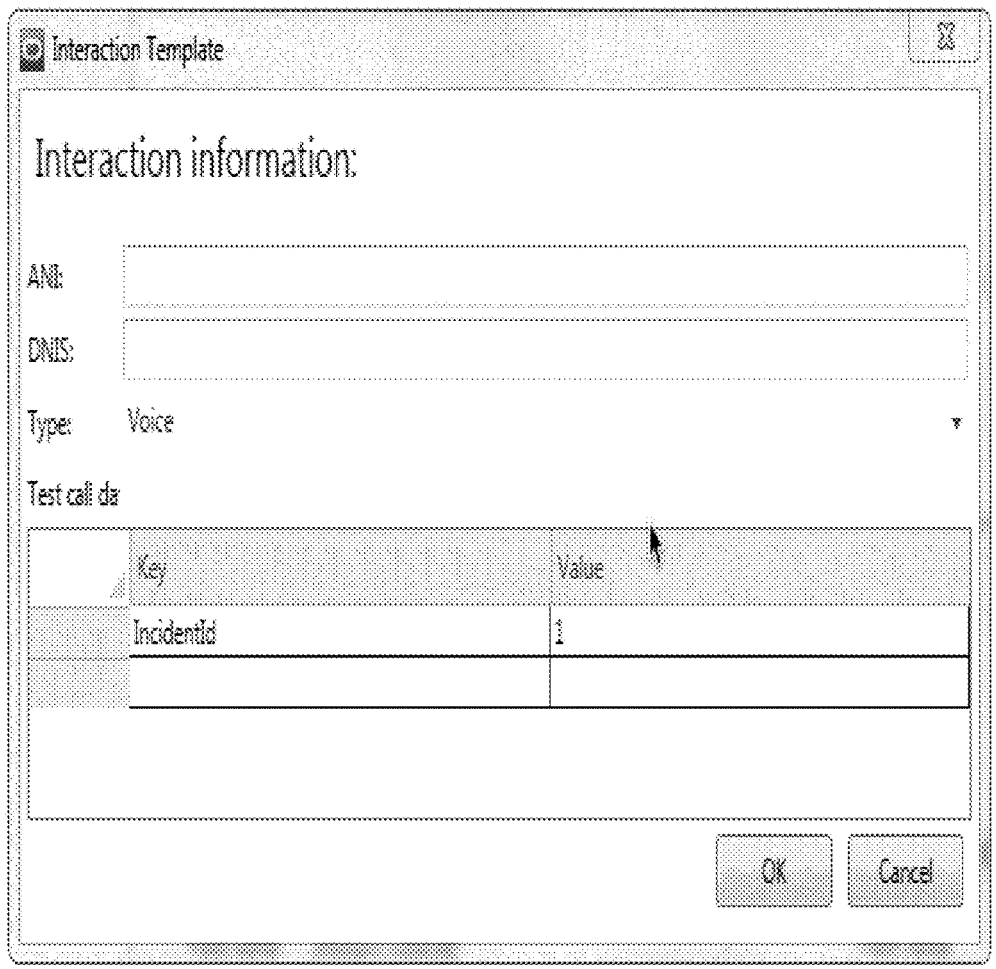
FIG. 15 shows an interaction template of the user interface, where a user can define sample call data or interaction values to be sent with the execution request of an interaction workflow for the visual programming environment of an embodiment of the present invention.

Clicking the "Execute" button will open the Interaction Template, shown in FIG. 15, where a user can define sample Call Data or Interaction values to be sent with the execution request as test input data for simulation. Using this tool, a user is able to test all aspects of an Interaction Workflow, see the actual results of the tests within the system environment, through capture and display of test data outputs, and make real-time adjustments to the user's Interaction Workflows. Another particular benefit of this aspect of the described embodiment is that is avoids the need for a user to utilize a separate stand-alone simulator software. One embodiment of the system also provides a set of rules and an assessor software object for assessing or validating that the programmed interaction workflow is executable, i.e., that it does not contain runtime errors (as opposed to logic errors which can be debugged by use of the simulator). In one embodiment, this validation occurs automatically when a user tries to save an interaction workflow. In this way, the upon saving, the user is automatically warned if the interaction workflow is non-functional due to programming errors. This feature serves to simplify the programming process and make it easier and more accessible to non-CTI programmer users of the visual programming system of the present invention One embodiment of the system also includes an assessor-debugger software object for assessing the behavior of the executable interaction workflow during simulation to validate the operation of the executable interaction workflow in a contact center environment and identify bugs in the executable interaction workflow to the user, so that any identified bugs in the workflow can be debugged.

The system of the present invention provides for the creation and use of a wide variety of activities that are useful in programming interaction workflows for contact center agents. The following describes certain exemplary activities in detail. Note that field names, especially for custom fields and custom attributes (created with the Custom Object Designer), or report IDs etc. are often specific to each unique deployment of a contact center system and may be modified as understood by one of skill in the art. Moreover, in view of the disclosure herein, one of ordinary skill in the art will appreciate that different activities may be programmed as needed for any particular embodiment or installation to account for particular contact center system requirements or user needs.

Figure 16:
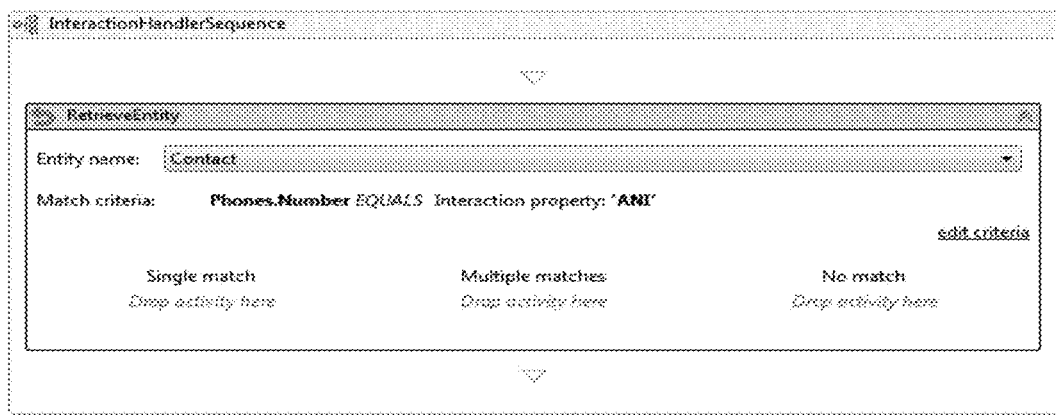
FIG. 16 shows an initial interface for the RetrieveEntity activity for the visual programming environment of an embodiment of the present invention.
Figure 17:
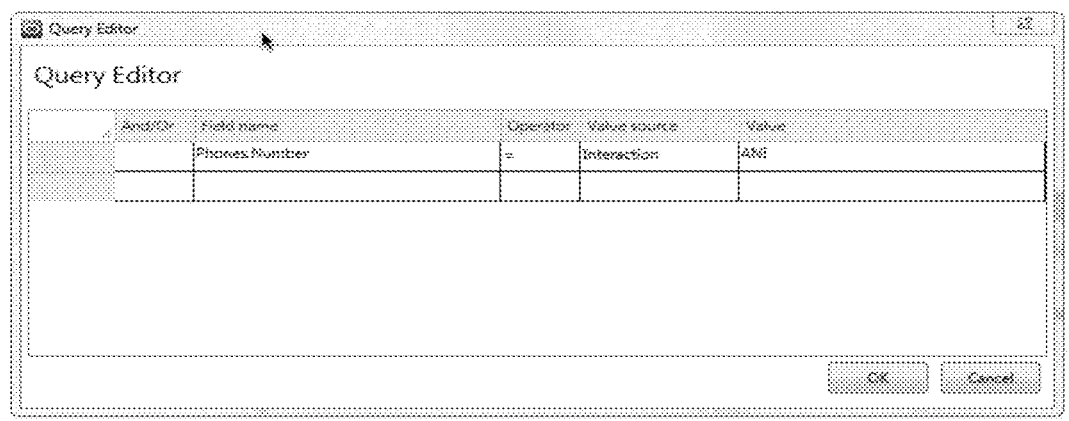
FIG. 17 shows a Query Editor for an activity for the visual programming environment of an embodiment of the present invention.
Figure 18:
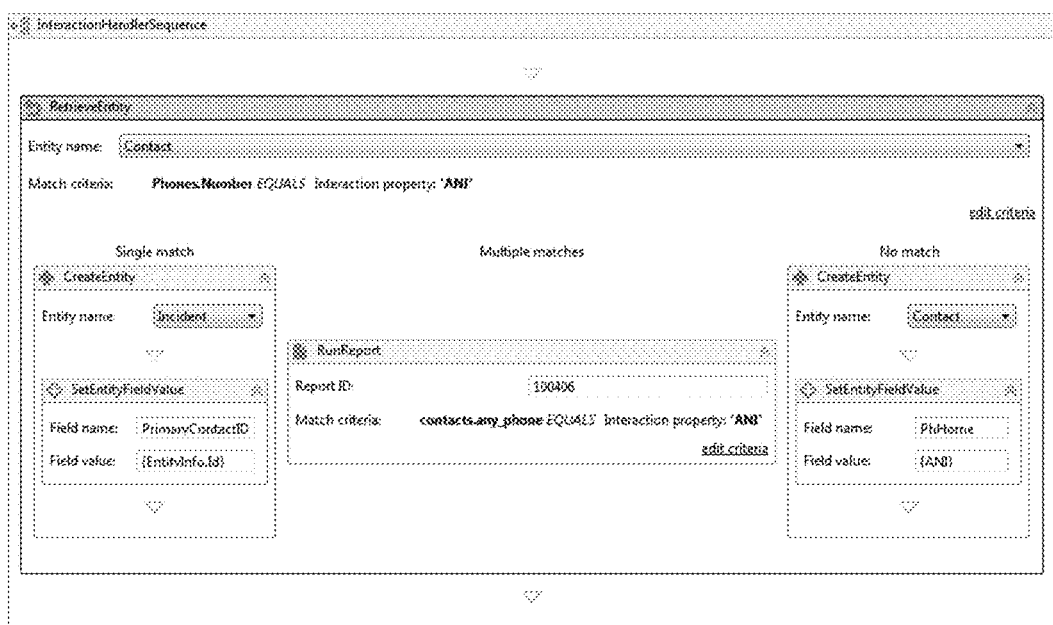
FIG. 18 shows an expanded and populated interface for the RetrieveEntity activity for the visual programming environment of an embodiment of the present invention.

The RetrieveEntity Activity performs a look-up in the specified system database using specific search criteria defined within the Activity. For example, a user may want to take the CallerID (ANI) attached to an incoming call, and do a look-up in the Contact table for a Contact Record that contains that CallerID. Upon completion of the look-up, the Contact Record is retrieved for further processing within the system. FIGS. 16-18 illustrates the use of this Activity. The RetrieveEntity Activity is subject to the following configuration parameters:

- Entity Name: system database to be searched against. Includes any out-of-the-box table or custom tables.
- Match Criteria: Conditional logic used to define the search criteria. Access by clicking "edit criteria" link on right.
- Single Match: Branch of logic to be followed when only one matching record is found. Supports Activity nesting.
- Multiple Matches: Branch of logic to be followed when more than one matching records are found. Supports Activity nesting.
- No Match: Branch of logic to be followed when no matching records are found. Supports Activity nesting.

Moreover the RetrieveEntity Activity has the following "Match Criteria" Parameters:

- And/Or: Conditional logic used to define multiple search criteria.
- Field Name: Specific field in the selected table to search against.
- Operator: Conditional operator used to define search criteria.
- Value Source: The source or type of data to be used as the comparative value when conducting the look-up.
  - Interaction—reserved dataset provided by PopFlow. Includes ANI and DNIS.
  - Interaction Data—non-reserved dataset (any other datasets) being received by the PopFlow Listener.
  - Interaction Variable—any variable previously defined within the Interaction Workflow (see AssignInteractionVariable for further details).
  - Static Value—any static value desired and defined in the "Value" column.
- Value: The comparative value to use when conducting the look-up.

The RetrieveEntity Activity supports Activity nesting to support longer chains of logic. In the example below, CreateEntity Activities and a RunReport Activity have been nested to provide basic screen-pop logic. In this example, the Interaction Workflow has been configured to use the CallerID (ANI) of an incoming call to do a look-up (RetrieveEntity) in Service Cloud's Contact table. The RetrieveEntity has been configured to look, specifically, in the Phones. Number field for a match on ANI (look at any phone number fields for a match on the current CallerID).

On a single match, the system of the present invention will automatically create a new Incident and associate the retrieved Contact Record to that Incident. If multiple matches are found, the system will execute a custom report (by ID) and pass filter criteria to the report so that it shows only the Contact Records with matching CallerID (ANI). If no matching Contact Records are found, PopFlow will create a new Contact Record and automatically populate the Home Phone fields with the current CallerID (ANI).

Figure 19:
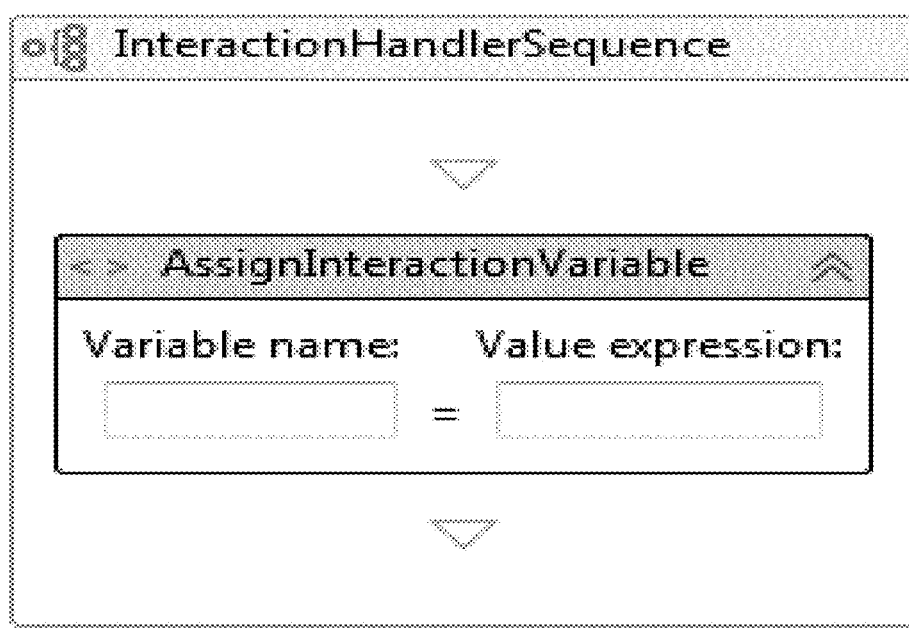
FIG. 19 shows an initial interface for the AssignInteractionVariable activity for the visual programming environment of an embodiment of the present invention.
Figure 20:
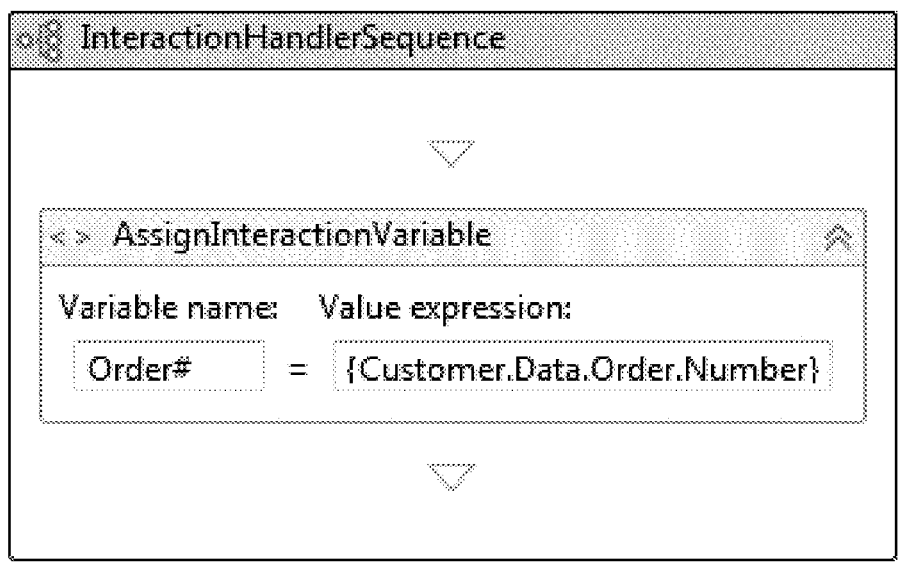
FIG. 20 shows an expanded and populated interface for the AssignInteractionVariable activity for the visual programming environment of an embodiment of the present invention.

The AssignInteractionVariable Activity provides the ability to assign a variable that can be used within the Interaction Workflow, as shown in FIGS. 19-20 is subject to the following configuration parameters:

- Variable Name: the name of the variable being created. This name will be used in the Interaction Workflow to reference the variable.
- Value Expression: the definition or expression that describes the variable. Note that evaluated expressions, such as ANI, must be contained by curly braces { }. When using the Interaction Variable's value within other Activity logic, the variable will be contained by curly braces. For example, {Variable.CustomVar} will retrieve the value stored in the Interaction Variable named CustomVar.

Variables may be used in a variety of ways, including as a means to make it easier to reference more complicated expressions. For example, the AssignInteractionVariable Activity below is used to define a shorter method for referencing the data element "Customer.Data.Order.Number." Once the Interaction Variable has been set, any other place within the Interaction Workflow where a user needs to reference that data element, the user can do so by entering {Variable. Order#} instead of having to enter the entire proper name of the data element.

Another way to use these variables is when opening multiple entities. As a user opens the second entity, the properties of the first one go out of scope and can no longer be accessed. For example, if the user wants to store a Contact ID in an Incident, the user can store it in an Interaction Variable, and insert it into the Incident.

Figure 21:
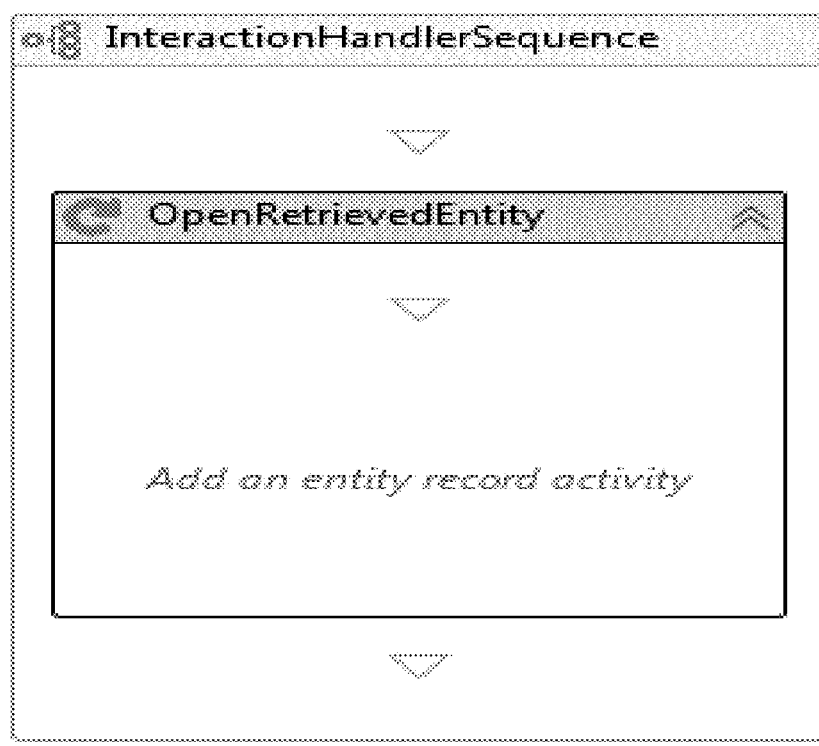
FIG. 21 shows an initial interface for the OpenRetrievedEntity activity for the visual programming environment of an embodiment of the present invention.
Figure 22:
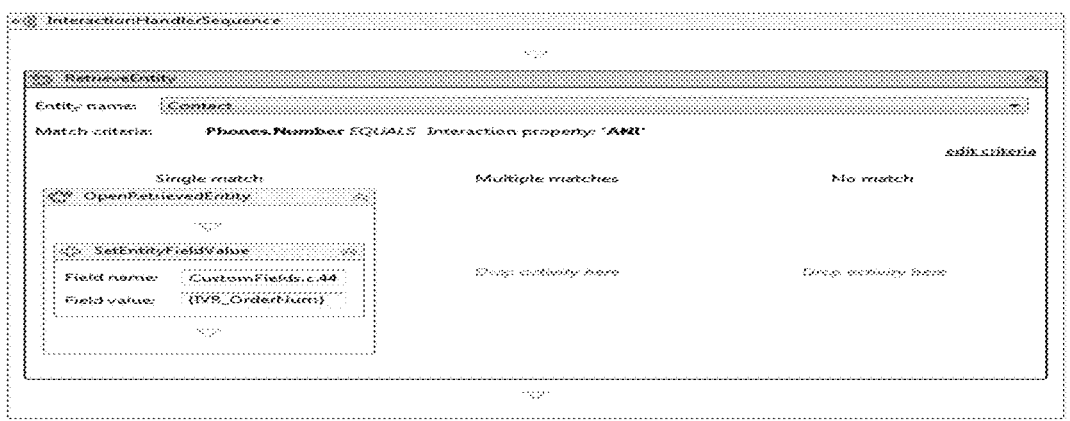
FIG. 22 shows an expanded and populated interface for the OpenRetrievedEntity activity for the visual programming environment of an embodiment of the present invention.

The OpenRetrievedEntity Activity is illustrated in FIGS. 21-22 and opens the immediate previous retrieved entity (the last entity that was retrieved in the workflow logic). For example, a user may choose to retrieve a Contact Record (using RetrieveEntity) and, on a single match, open the Contact Record that was retrieved (using OpenRetrievedEntity).

While there are no configuration parameters for the OpenRetrievedEntity Activity, the Activity does allow for the nesting of Entity Record Activities, such as the SetEntityFieldValue Activity (see SetEntityFieldValue for additional details). In the example below, the Interaction Workflow is configured to do a look-up in the Contact table based on CallerID (ANI). When a single matching Contact Record is found, the system will open the found Contact Record and automatically populate a custom field (custom field ID=44) with an order number entered via an IVR. Note this example assumes that the IVR is attaching a CallData field named "IVR_OrderNum." Note also the manner of indicating a Custom Field value; see SetEntityFieldValue for more information about how to work with custom fields.

Figure 23:
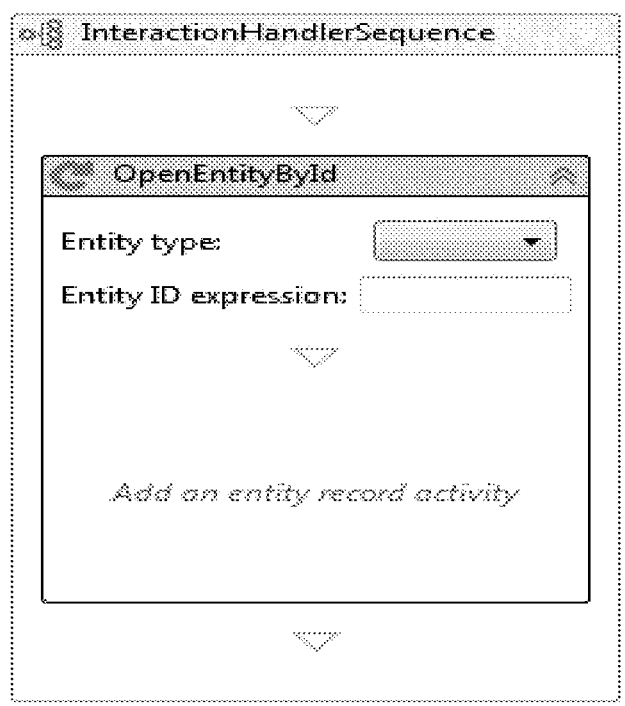
FIG. 23 shows an initial interface for the OpenEntityById activity for the visual programming environment of an embodiment of the present invention.
Figure 24:
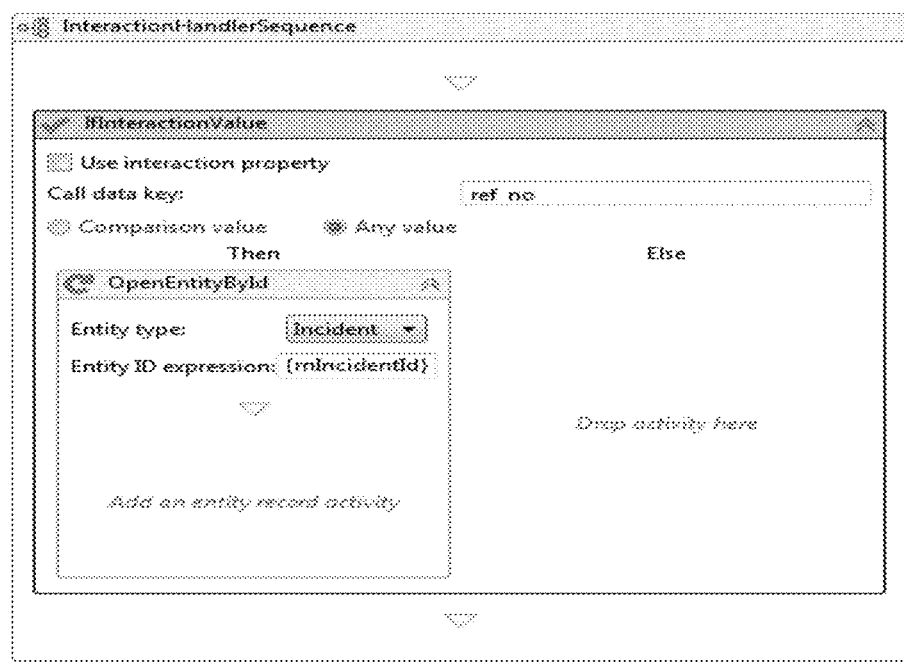
FIG. 24 shows an expanded and populated interface for the OpenEntityById activity for the visual programming environment of an embodiment of the present invention.

The OpenEntityById Activity opens a specific entity based upon the entity's ID number and is illustrated in FIG. 23-24. It is subject to the following configuration parameters:

- Entity Type: the type of entity to be opened.
- Entity ID Expression: the expression used to identify the number associated to the specified entity. Note that evaluated expressions must be contained by curly braces. { }

The most common use of this Activity is to open a record of a specific type when a customer has entered that value in an IVR or on a website (Customer Portal). For example, if a customer is prompted by the IVR to enter their existing Reference Number for an open Incident, the system can pop the specified Incident onto the agent's screen. In the example of FIG. 24, the system tests to see if an Incident Number (Reference Number) has been received for the incoming call (see IfInteractionValue for details). If so, PopFlow opens the Incident on the agent's screen using the Incident Number the customer entered.

Figure 25:
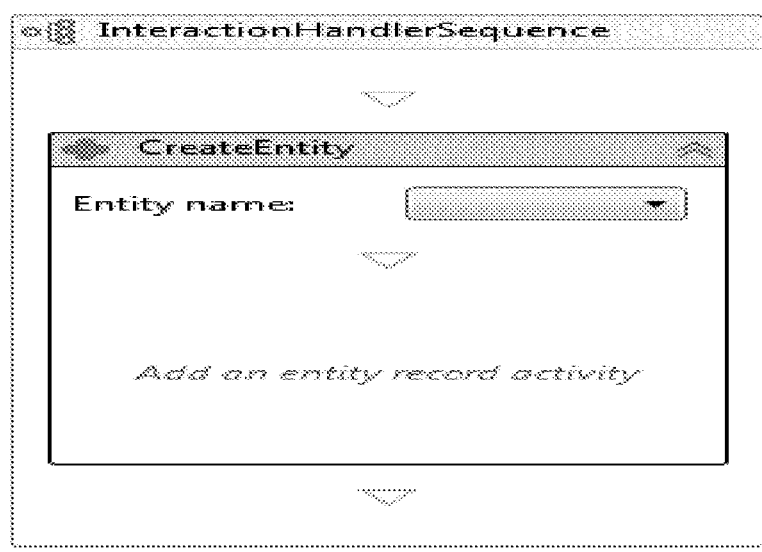
FIG. 25 shows an initial interface for the CreateEntity activity for the visual programming environment of an embodiment of the present invention.
Figure 26:
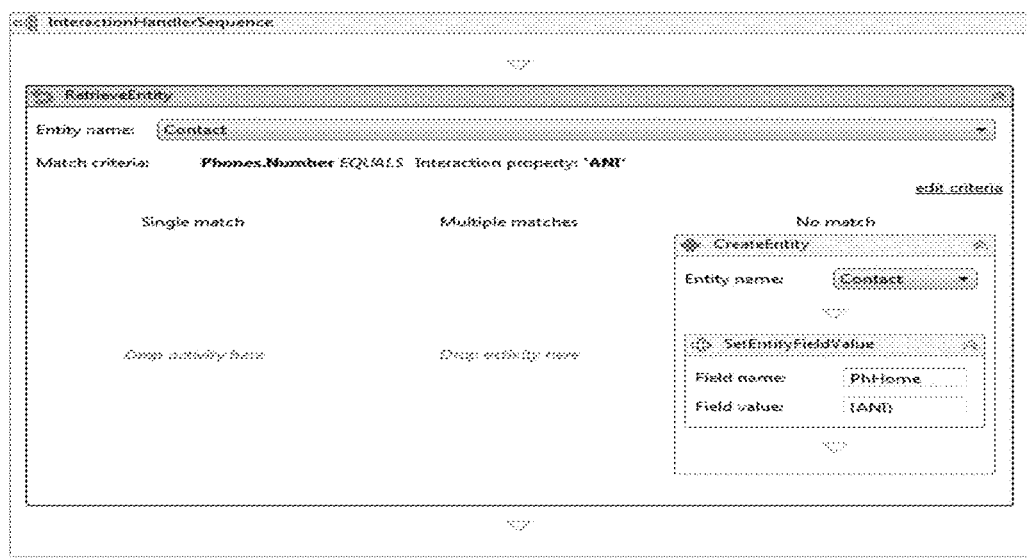
FIG. 26 shows an expanded and populated interface for the CreateEntity activity for the visual programming environment of an embodiment of the present invention.

The CreateEntity Activity creates the type of entity specified in the agent's console and is illustrated in FIGS. 25-26. For example, if a customer's Caller ID is not found in the Contact table, the user may want PopFlow to automatically create a new Contact Record for the customer. It is subject to the following configuration parameters Entity Name: the type of entity to be created by PopFlow (Contact, Incident, Organization, etc.).

Note that the CreateEntity Activity allows for nesting of Entity Record Activities such as the SetEntityFieldValue Activity. In the example of FIG. 26, a look-up is performed in the Contact table using searching for a match on a customer's CallerID. If no match is found, the software creates a new Contact Record (using CreateEntity) and automatically populates the Contact Record's Home Phone field with the current CallerID (ANI).

Figure 27:
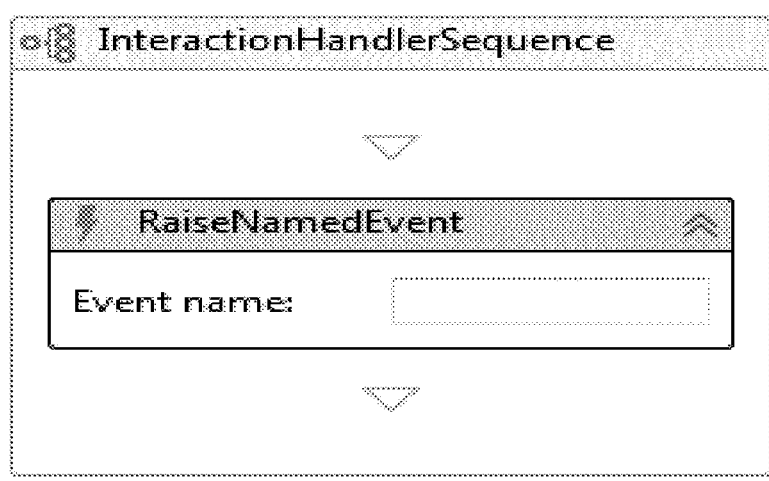
FIG. 27 shows an initial interface for the RaiseNamedEvent activity for the visual programming environment of an embodiment of the present invention.
Figure 28:
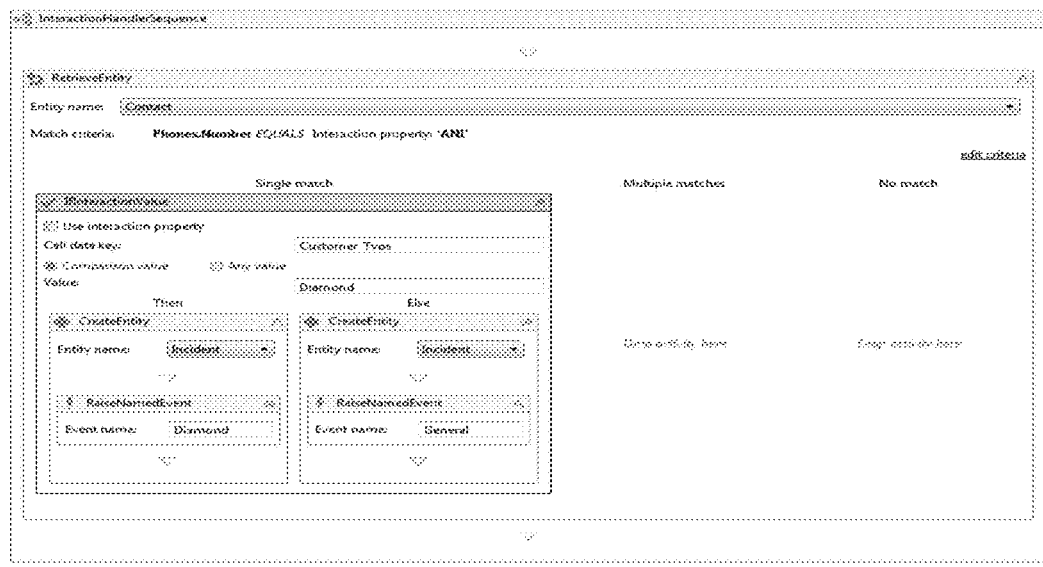
FIG. 28 shows an expanded and populated interface for the RaiseNamedEvent activity for the visual programming environment of an embodiment of the present invention.

The RaiseNamedEvent Activity can be used to fire a "named event" within a system workspace or workflow and is illustrated in FIGS. 27-28. For example, a user might create a workflow that uses a named event to take different logic paths based on the event that is fired within the runtime environment for a particular service contact interaction workflow. It is subject to the following configuration parameters:

Event Name: Can be any name/value desired. The name provided should correspond with the event name used in the workspace or workflow that takes action based on the event firing.

In the example of FIG. 28, the Interaction Workflow has been configured to determine if the calling party is a high-value (e.g., "Diamond") customer. If so, the system creates a new Incident and raises a named event of "Diamond." If not, the system creates a new Incident and raises a named event of "General." In this example, the interaction workflow might open a unique workspace for the "Diamond" customer as opposed to a general workspace for the "General" customer.

Figure 29:
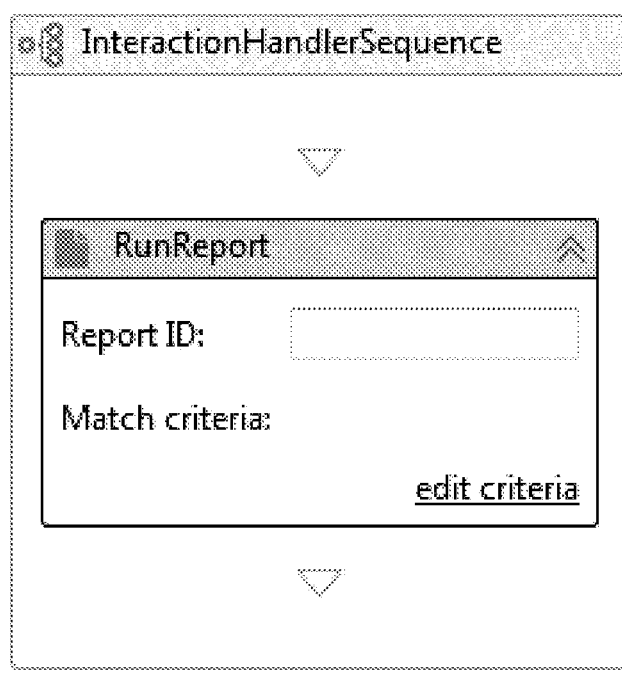
FIG. 29 shows an initial interface for the RunReport activity for the visual programming environment of an embodiment of the present invention.
Figure 30:
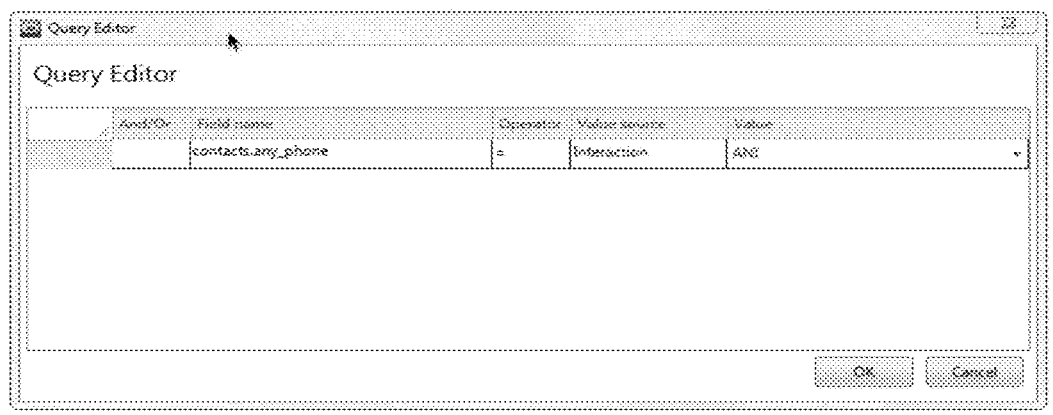
FIG. 30 shows use of the Query Editor to select inputs to the for the RunReport activity for the visual programming environment of an embodiment of the present invention.
Figure 31:
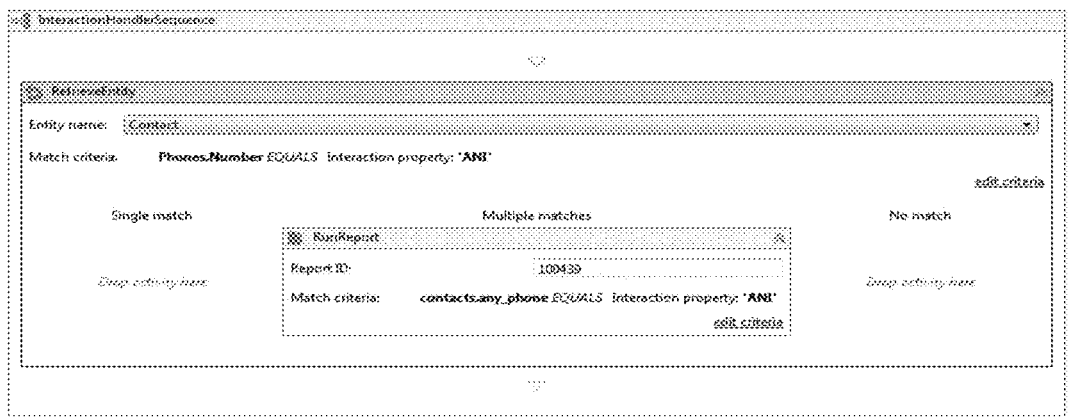
FIG. 31 shows an expanded and populated interface for the RunReport activity that has been configured to perform a look-up against the Contact table (using RetrieveEntity) using the Caller ID (ANI), for the visual programming environment of an embodiment of the present invention.

The RunReport Activity opens a pre-defined system report in a new tab in the system Console and is illustrated in FIGS. 29-31. For example, if multiple Contacts are found for a specific caller based on Caller ID, the system can run a Contact report that displays all matches found. It is subject to the following configuration parameters:

Report ID: the ID number of the report to be run.

Match Criteria: the filter criteria to be passed to the report to limit the displayed results (limit the content of the report). Access by clicking "edit criteria" link on bottom, right.

It is also subject to the following "match criteria" parameters:

And/Or: Boolean logic used to define multiple filter criteria.

Field Name: the Expression used to define the report filter.

Operator: Boolean operator used to define search criteria.

Value Source: The source or type of data to be used as the report filter.

Interaction—reserved dataset provided by the software. Includes ANI and DNIS.

Interaction Data—non-reserved dataset (any other datasets) being received by the PopFlow Listener.

Interaction Variable—any variable previously defined within the Interaction Workflow (see AssignInteractionVariable for further details).

Static Value—any static value desired and defined in the "Value" column.

Value: The data or expression to use as the filter.

Note that any filter criteria passed to a report must be referenced, in the "Field Name" using the "Expression" of the filter. This name can be found by viewing the Definition of the report and looking at the list of filters. For each filter, the definition will show the Type, Name, Prompt, Expression etc. the expression must be typed into the "Field Name" column of the Query editor exactly as it appears in the report definition.

Note also that the RunReport Activity differs from the RunHttpReport in that the RunReport Activity will not refresh a currently open report with the new search filter when the report is run. The agent is expected to close reports opened by this method, so that the next time it runs, it will search with a new filter. To refresh data in a report already open in an Oracle Service Cloud Console tab, use the RunHttpReport Activity.

In the example of FIG. 31, the Interaction Workflow has been configured to perform a look-up against the Contact table (using RetrieveEntity) using the Caller ID (ANI). If multiple Contact Records are found that match the Caller ID of the current call, the software will display a pre-defined report using the Caller ID (ANI) as the filter criteria.

Figure 32:
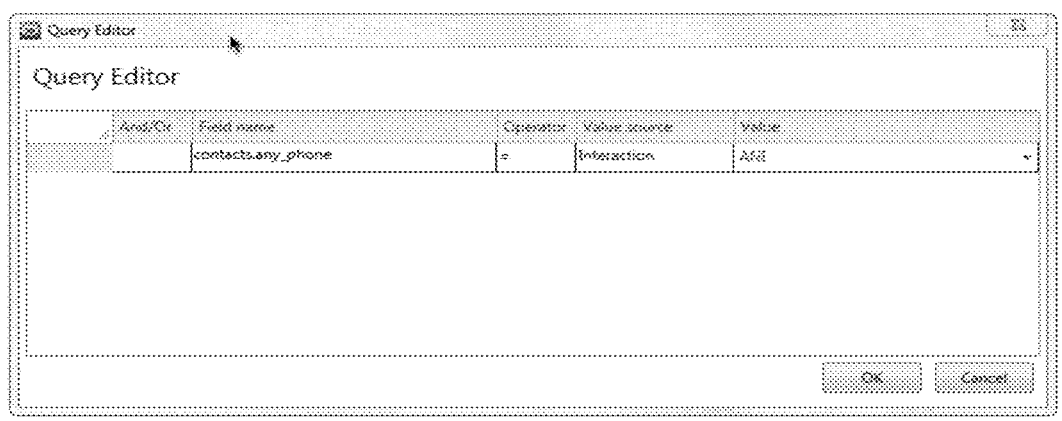
FIG. 32 shows use of the Query Editor for configuration of the RunHttpReport activity for the visual programming environment of an embodiment of the present invention.
Figure 33:
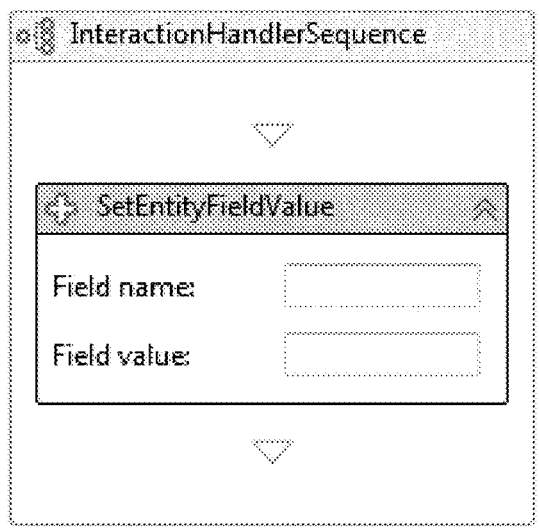
FIG. 33 shows an initial interface for the SetEntityFieldValue activity for the visual programming environment of an embodiment of the present invention.

The RunHttpReport Activity is illustrated in FIG. 32, and functions exactly like the standard RunReport Activity with one exception. When executed, the RunHttpReport Activity will open a pre-defined system report in a new tab in the system Console. If that tab is left open by the agent, and another RunHttpReport Activity is executed, the RunHttpReport Activity will refresh the existing report with any new filter criteria passed to the report. It is subject to the following configuration parameters:

Report ID: the ID number of the report to be run.

Match Criteria: the filter criteria to be passed to the report to limit the displayed results (limit the content of the report). Access by clicking "edit criteria" link on bottom, right.

It is also subject to the following match criteria parameters:

And/Or: Boolean logic used to define multiple filter criteria.

Field Name: the Expression used to define the report filter.

Operator: Boolean operator used to define search criteria.

Value Source: The source or type of data to be used as the report filter.

Interaction—reserved dataset provided by PopFlow. Includes ANI and DNIS.

Interaction Data—non-reserved dataset (any other datasets) being received by the PopFlow Listener.

Interaction Variable—any variable previously defined within the Interaction Workflow (see AssignInteractionVariable for further details).

Static Value—any static value desired and defined in the "Value" column.

Value: The data or expression to use as the filter.

Note that any filter criteria passed to a report must be referenced, in the "Field Name" using the "Expression" of the filter. This name can be found by viewing the Definition of the report and looking at the list of filters. For each filter, the definition will show the Type, Name, Prompt, Expression etc. the expression must be typed into the "Field Name" column of the Query editor exactly as it appears in the report definition.

The SetEntityFieldValue Activity is used to automatically populate fields within an entity and is illustrated in FIGS.

33-36. For example, if nested within a Contact entity Activity, the SetEntityFieldValue Activity can be used to automatically populate phone fields, name fields or other custom fields or attributes. It is subject to the following configuration parameters:

Field Name: the field name to be populated.
Field Value: the static value, variable or expression to insert into the field identified above. Note that expressions must be contained by curly braces. { }

Using this activity, Field Names must be referenced differently for different types of fields within the system. For example, standard fields can be referenced using the standard database column name from the system Data Dictionary (ex. Incidents/Reference #=ref_no). Custom fields can be referenced using their Custom Field ID number (ex. CustomFields.c.44) or by their name (ex. CustomFields.c.MyCustomField). Custom Attributes (created with the Object Designer) can be referenced using their Package Name and Attribute Name (ex. CustomFields.OpenMethods.IVR_Selection).

Figures 34, 35, 36:
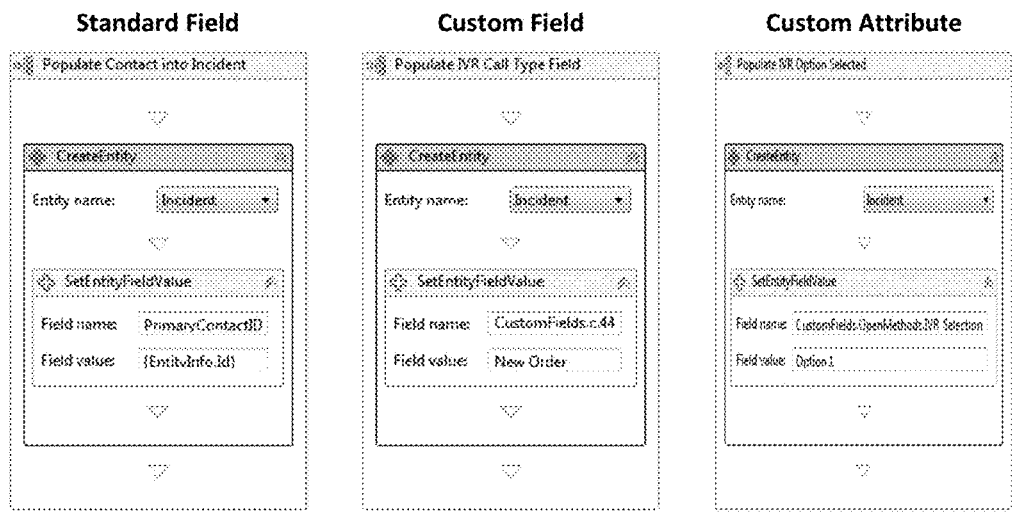
FIG. 34 shows an expanded and populated interface for the SetEntityFieldValue activity, in the context of a using a standard field with the CreateEntity activity, for the visual programming environment of an embodiment of the present invention.
FIG. 35 shows an expanded and populated interface for the SetEntityFieldValue activity, in the context of a using a custom field with the CreateEntity activity, for the visual programming environment of an embodiment of the present invention.
FIG. 36 shows an expanded and populated interface for the SetEntityFieldValue activity, in the context of a using a custom attribute with the CreateEntity activity, for the visual programming environment of an embodiment of the present invention.

The examples of FIGS. 34-36 demonstrate setting field values using each of the methods described above.

Figure 37:
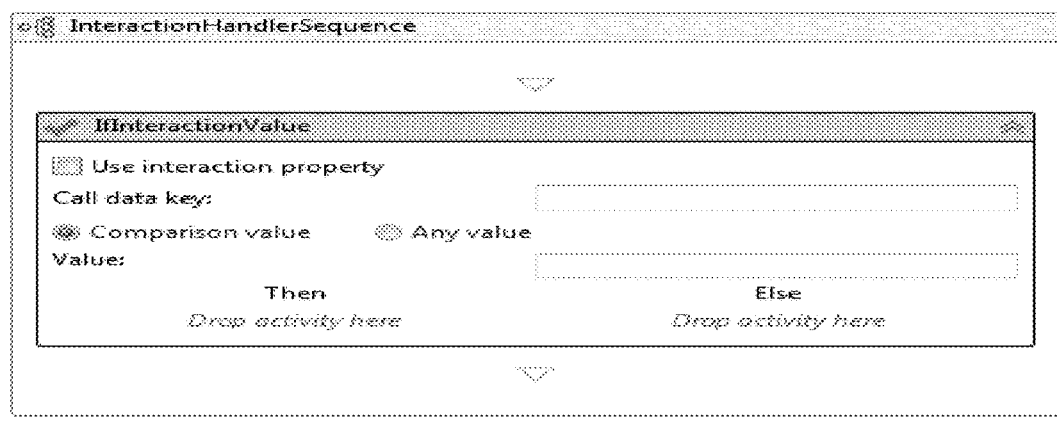
FIG. 37 shows an initial interface for the IfInteractionValue activity for the visual programming environment of an embodiment of the present invention.
Figure 38:
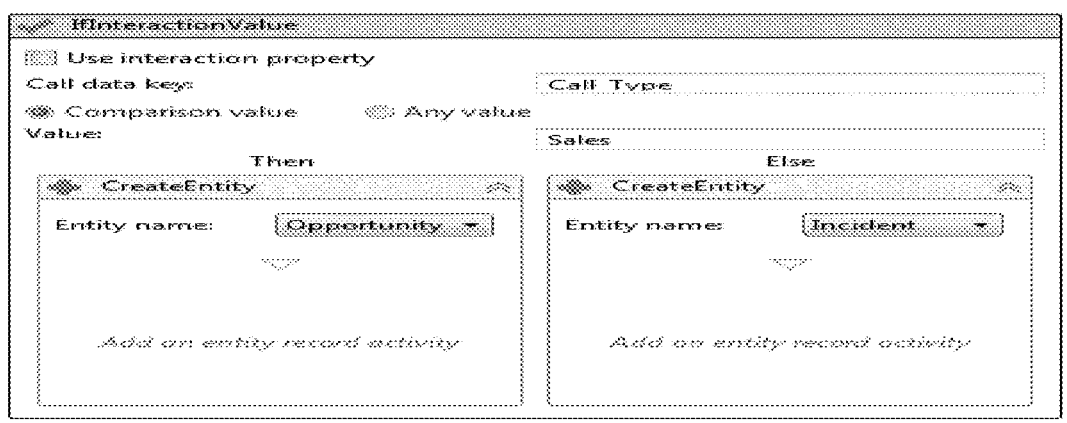
FIG. 38 shows an expanded and populated interface for the IfInteractionValue activity for the visual programming environment of an embodiment of the present invention.

The IfInteractionValue activity, illustrated in FIGS. 37-38 provides conditional If-Then-Else logic to allow for multiple paths through an Interaction Workflow based upon specific values or interaction data. For example, users can control which of two paths the Interaction Workflow will take based upon a specified condition. It is subject to the following configuration parameters:

Use Interaction Property: limits the test criteria to reserved PopFlow Interaction Data (ANI, DNIS). When selected, the desired Interaction Property (data element) can be select from a drop-down menu.
Call Data Key: the name of the data element (such as data from IVR) to be used as the test criteria.
Comparison Value/Any Value: "Comparison Value" is the specific value to be tested against. "Any Value" tests for the existence of any value in the Call Data Key. If there is no value, or if the Call Data Key does not exist, the Else branch will be used.
Then: the branch of logic to be followed if the Call Data Key is equal to the Comparison Value.
Else: the branch of logic to be followed if the Call Data Key is not equal to the Comparison Value.

Note that activities can be nested in the "Then" and "Else" configuration panes, including additional IfInteractionValue activities if needed. In the example of FIG. 38 the Interaction Workflow is configured to test for Call Type (data element potentially received from an IVR). If the Call Type is equal to "Sales" then PopFlow creates a new Opportunity. If it is not equal to "Sales" then PopFlow creates a standard Incident.

Figure 39:
FIG. 39 shows an initial interface for the Sequence activity for the visual programming environment of an embodiment of the present invention.

The Sequence Activity, illustrated in FIG. 39 is a container that allows for a series of Activities to be grouped and run sequentially through an Interaction Workflow. To maintain the validity of logic with the Workflow Designer, it is sometimes necessary to group items together using a Sequence Activity. For example, when retrieving an entity (using RetrieveEntity), a Sequence Activity would be required to perform multiple Activities in a "Single Match" scenario.

While there are no configuration parameters for Sequence Activities, and since the Activity is actually a container, multiple activities can be nested inside of a Sequence. For example, a Sequence Activity may be used to perform multiple actions in the "Single Match" scenario of a RetrieveEntity Activity. Specifically, when the call enters, the system performs a look-up against the Contact table for a match on the current Caller ID (ANI). If a single match is found, the system looks for any open Incidents associated to that Contact. If a single open Incident is found, the system opens the Incident. If multiple open Incidents are found, the system runs a report showing all of the open Incidents. If no open Incidents are found the system creates a new Incident and associates the Contact Record to the new Incident.

Figure 40:
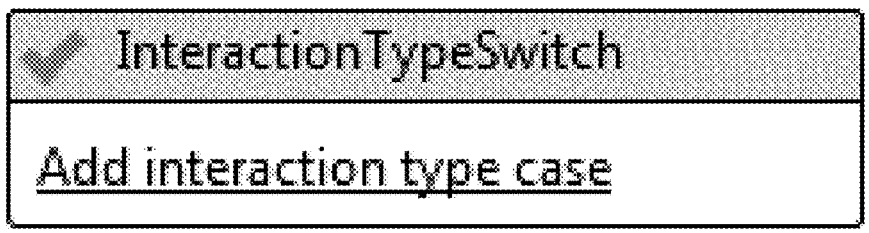
FIG. 40 shows an initial interface for the InteractionTypeSwitch activity for the visual programming environment of an embodiment of the present invention.
Figure 41:
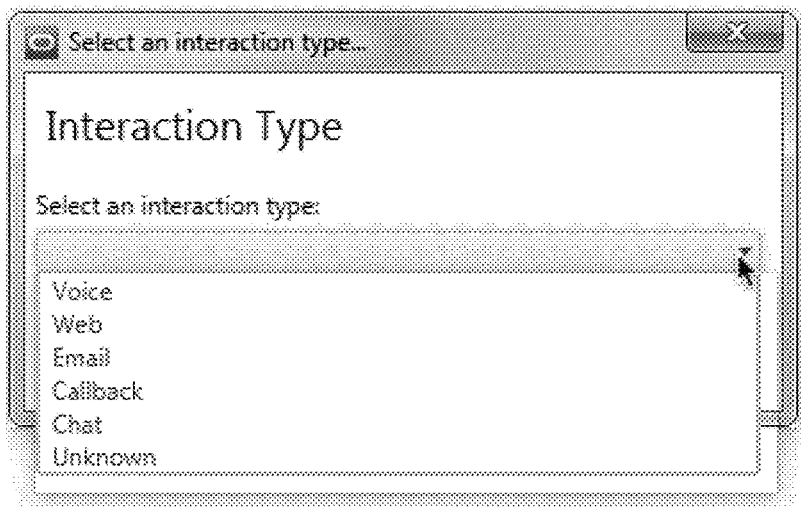
FIG. 41 shows an expanded interface for the InteractionTypeSwitch activity for the visual programming environment of an embodiment of the present invention.
Figure 42:
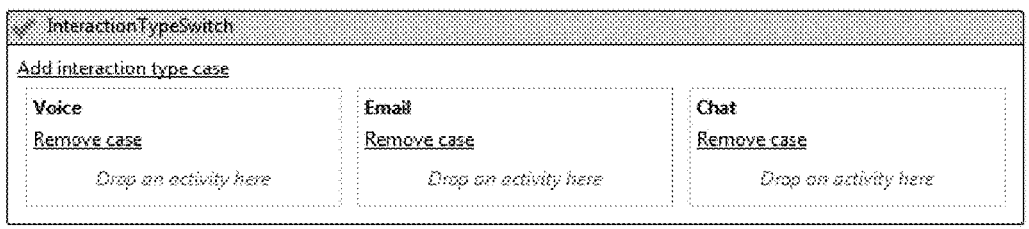
FIG. 42 shows an expanded and populated interface for the InteractionTypeSwitch activity for the visual programming environment of an embodiment of the present invention.

The InteractionTypeSwitch Activity is used to identify unique branches of workflow logic based upon the type of interaction and is illustrated in FIGS. 40-42. This allows for a single Interaction Workflow to have unique chains of Activities for every different type of interaction. For example, a single Interaction Workflow could contain logic to handle voice interactions, e-mail interactions and chat interactions. It is subject to the following configuration parameters:

Add Interaction Type Case—prompts the user to define a new chain of logic for the selected Interaction Type. Available Interaction Type are Voice, Web, E-Mail, Callback, Chat and Unknown. Note that nesting is supported in all Interaction Types for all Activities.

Figure 43:
FIG. 43 shows an initial interface for the RaiseIntegrationEvent activity for the visual programming environment of an embodiment of the present invention.
Figure 44:
FIG. 44 shows an expanded and populated interface for the RaiseIntegrationEvent activity for the visual programming environment of an embodiment of the present invention.

The RaiseIntegrationEvent Activity is used to share data with other Service Cloud Add-Ins and is illustrated in FIGS. 43-44. For example, data collected from a telephony platform, IVR and/or third-party application that is available within the system can be shared with other custom system add-ins to improve the performance of a custom add-in. It is subject to the following configuration parameters:

Event Name: the data to be shared through a string in the format of a Named Event followed by some number of Key/Value pairs—NamedEvent:KeyName1={Value1}&KeyName2={Value2}&KeyName3={Value3}

The example in FIG. 44 demonstrates PopFlow passing data to a custom, third-party add-in called CCA_AddIn. The RaiseIntegrationEvent is sharing two data elements with the add-in; the Caller (ANI) through a KVP called Phone, and a Customer ID through a KVP called CCA_ID.

Using this Activity requires development effort for the consumer of the Integration Event.

Figure 45:
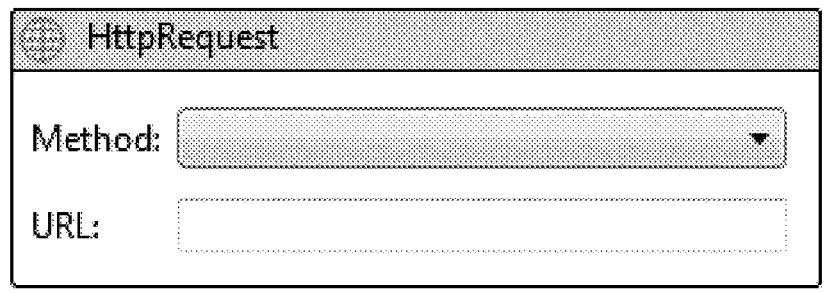
FIG. 45 shows an initial interface for the HttpRequest activity for the visual programming environment of an embodiment of the present invention.

The HttpRequest Activity allows users to pass standard HTTP GET and POST requests to external web services for the purposes of sharing data and is illustrated in FIG. 45. It is subject to the following configuration parameters:

Method: selectable options are GET and POST
URL: allows the user to input a properly formatted HTTP GET or POST request string As an example, a user may wish to retrieve customer data, not available in the system, from a third-party application so that it can be used as a part of the screen-pop process and inserted into the system. Alternatively, users may wish to send data that is available in the system to a third-party application so that the external application can be staged for use during this incoming call.

Figure 46:
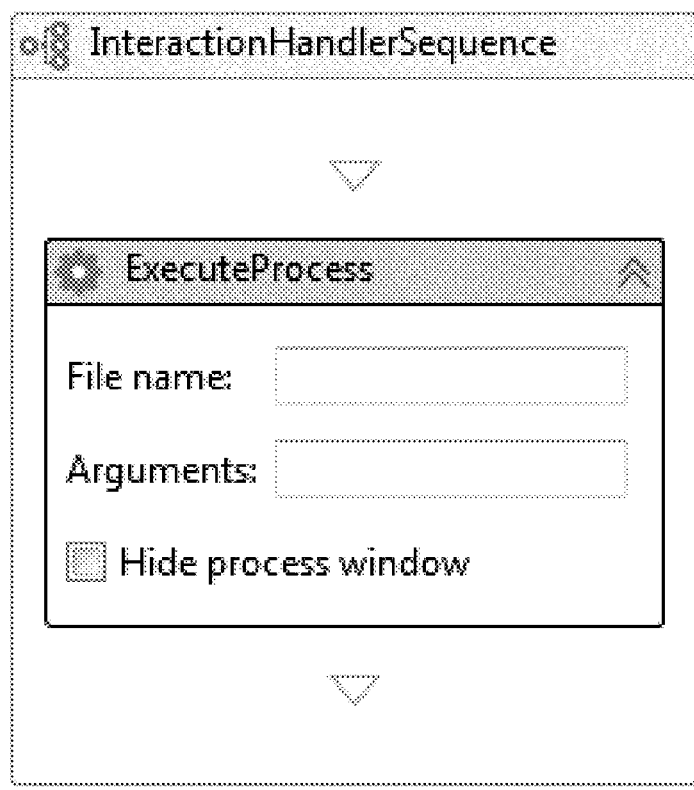
FIG. 46 shows an initial interface for the ExecuteProcess activity for the visual programming environment of an embodiment of the present invention.

The ExecuteProcess Activity, illustrated in FIG. 46 is used to launch processes or application on the local workstation that are external to the system console and, in the process, share data with those applications. This integration technique can be used much like the HttpRequest Activity except using local applications on the workstation as the source or recipient of the data shared. It is subject to the following configuration parameters:

File Name: the name of the local process or application to launch
Arguments: arguments to be passed to the external process or application. Can be used to pass runtime parameters for the service/application or to share data in the form of multiple arguments.

There are times when the incoming Call Data will need to be manipulated before string comparisons with a customer database will work. For example, the incoming data might have a "+1" prefix for each phone number, but the customer database contains only the 10-digits of a phone number without the +1. In this case, it is possible to use Replace or Regex parsers to modify strings. These both work by appending ".Replace" or ".Regex" to any string normally visible to AssignInteractionVariable. This Activity is illustrated in FIG. 47.

From the disclosure above, one of ordinary skill will appreciate that use of new system components will require programming and development of new listeners capable of gathering data from the particularized interface of that system component; however, because the listener provides a level of abstraction between the interface of the system component and the executable workflow, no additional programming of any existing interaction workflow will be necessary.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments disclosed, but the invention is to be given the largest possible scope which is consistent with the principles and features described herein and shall be limited only by the claims set forth below.

Insofar as the description above discloses any additional subject matter that is not within the scope of the claims below, the inventions are not dedicated to the public and the right to file one or more applications to claim such additional inventions is reserved.

What is claimed is:

1. A method for visually programming a computer to create at least one executable interaction workflow for a contact center live-agent, using a processor, a computer display and a memory storing a plurality of activities, comprising:
    using the processor to present a visual programming environment on the computer display;
    using the processor and the memory to provide the plurality of activities for selection within the visual programming environment;
    wherein each of the plurality of activities is a software object that is stored in the memory and linked to a displayable visual symbol within the visual programming environment;
    wherein each of said plurality of activities further comprises software for performing at least one task in conjunction with a host system for the contact center, comprising: gathering information, handling information, handling an interrupt, executing decisional logic, presenting a workspace or presenting a screen pop on a computer display for a live-agent;
    wherein at least one of the plurality of activities is linked to a listener, said listener comprising software code for collecting information from a contact center system component and passing that collected information to the respective linked activity for handling;
    wherein at least one of the plurality of activities is linked to a customer relationship management (CRM) database comprising at least one item of CRM data, and said at least one of the plurality of activities enables presentation of the item of CRM data on the computer display of the live agent and further enables the live agent to edit the item of CRM data;
    selecting a first visual symbol of one or more of the plurality of activities;
    dragging and dropping the first visual symbol within the visual programming environment;
    selecting a second visual symbol of one or more of the plurality of activities;
    dragging and dropping the second visual symbol within the visual programming environment, thereby creating a visual representation of the at least one executable interaction workflow; and
    saving the at least one executable interaction workflow in the memory.

2. The method of claim 1 wherein a screen pop is presented on the computer display for a live-agent that contains information collected by one of the plurality of listeners.

3. The method of claim 2 wherein the screen pop is presented on the computer display for a live-agent because the information collected by one of the plurality of listeners is passed to one of the plurality of activities that triggers the screen pop as a result of receiving the collected information.

4. The method of claim 1 further comprising:
    validating that the executable interaction workflow can execute.

5. The method of claim 1 further comprising:
    using the plurality of activities in the visual programming environment to create a new activity; and
    saving the new activity in the memory;
    wherein, upon creation and saving, the new activity can be selected for incorporation into said executable interaction workflow.

6. The method of claim 1 further comprising:
    simulating the behavior of the executable interaction workflow outside of the contact center environment; and
    assessing the behavior of the executable interaction workflow during simulation to validate the operation of the executable interaction workflow in a contact center environment.

7. The method of claim 6 wherein the simulation step further comprises insertion of test data and execution of the executable interaction workflow using the test data.

8. The method of claim 6 further comprising presenting test data inputs and capturing test data outputs.

9. The method of claim 1 wherein the listener is linked to an activity that, when said activity is executed, said activity will utilize the gathered information to populate that gathered information into a screen pop or execute decisional logic.

10. The method of claim 1 wherein the listener gathers information and passes that information to the respective linked activity in near real time.

11. The method of claim 1 wherein the listener gathers information from an interactive voice response system component.

12. The method of claim 1 wherein the listener gathers information from a text messaging system component.

13. The method of claim 1 wherein the listener gathers information from a social media system component.

14. The method of claim 1 wherein the listener gathers information from an email system component.

15. The method of claim 1 wherein the listener gathers information from a computer telephony integration (CTI) system component.

16. The method of claim 1 wherein the listener gathers information from a soft phone.

17. The method of claim 1 wherein the listener gathers automatic number identification (ANI).

18. The method of claim 1 wherein the listener gathers dialed number identification service (DNIS).

19. The method of claim 1 wherein one of the plurality activities gathers information from a customer relationship management system component.

20. A system for visual programming of an interaction workflow and information to be presented on a computer display for a contact center representative comprising:
a processor;
a memory;
a computer display;
executable computer code stored in the memory for execution on the processor comprising:
a visual programming environment;
a plurality of activities, each of said activities comprising a software object that is stored in the memory and linked to a displayable visual symbol within the visual programming environment;
wherein each of said plurality of activities further comprises software for performing at least one task comprising: gathering information, handling information, handling an interrupt, executing decisional logic, presenting a screen pop on a computer display for a live-agent or presenting an appropriate workspace on a computer display for the contact center representative;
wherein at least one of the plurality of activities is linked to a customer relationship management (CRM) database comprising at least one item of CRM data, and said at least one of the plurality of activities enables presentation of the item of CRM data on the computer display of the live agent and further enables the contact center representative to edit the item of CRM data;
wherein the visual programming environment further comprises a drag-and-droppable visual symbolic representation of each of the plurality of activities, such that an executable interaction workflow can be programmed by dragging and dropping a plurality of the visual symbolic representations together in an ordered arrangement;
a plurality of listeners, each of said listeners comprising a software object for gathering data from a respective system component using that respective system component's interface and then passing the gathered data to a respective activity of the plurality of activities; and
at least one instance of a runtime object comprising an executable software object that when executed, executes the executable interaction workflow to display appropriate workspaces, information or screen pops on a computer display for a contact center customer service representative.

21. The system of claim 20 further comprising:
a simulator environment for simulating the behavior of the executable interaction workflow in a contact center environment prior to deploying the executable interaction workflow in an actual contact center environment.

22. The system of claim 20 further comprising:
a validation object comprising an executable software object and a set of rules that when executed, validates that the executable interaction workflow can execute.

23. The system of claim 20 further comprising:
wherein the visual programming environment includes software code for enabling a user to create a new activity and save said new activity to the memory; and
wherein, upon creation and saving, the new activity can be selected for incorporation into said executable interaction workflow.

24. The system of claim 20 further comprising:
a simulator object for simulating the behavior of the executable interaction workflow, without executing the interaction workflow within the contact center environment;
an assessor-debugger object for assessing the behavior of the executable interaction workflow during simulation to validate the operation of the executable interaction workflow in a contact center environment and identify bugs in the executable interaction workflow.

25. The system of claim 24 wherein the simulator object executes within the visual programming environment.

26. The system claim 24 wherein the simulator object further comprises:
software code for insertion of test data;
software code for execution of the executable interaction workflow using the test data; and
software code for validation of the executable interaction workflow.

27. The system of claim 26 wherein the simulator object further comprises software code for presenting test data inputs and the assessor-debugger object further comprises software code for capturing test data outputs.

28. The system of claim 20 wherein the listener is linked to the respective activity such that, when said activity is executed, said activity will utilize the gathered information to populate that gathered information into a screen pop or execute decisional logic.

29. The system of claim 20 wherein the listener gathers information and passes that information to the respective linked activity in near real time.

30. The system of claim 20 wherein the listener gathers information from an interactive voice response system component.

31. The system of claim 20 wherein the listener gathers information from a text messaging system component.

32. The system of claim 20 wherein the listener gathers information from a social media system component.

33. The system of claim 20 wherein the listener gathers information from an email system component.

34. The system of claim 20 wherein the listener gathers information from a CTI system component.

35. The system of claim 20 wherein the listener gathers information from a soft phone.

36. The system of claim 20 wherein the listener gathers ANI.

37. The system of claim 20 wherein the listener gathers DNIS.

38. The system of claim 20 wherein one of the plurality activities gathers information from a customer relationship management system component.

39. A method for presenting appropriate host application workspaces, information and instructions to a contact center agent on a display screen during an interaction between the contact center agent and a customer, comprising:
executing a runtime environment on a processor with a memory and a display screen;

executing, within the runtime environment, an instance of a pre-programmed executable interaction workflow to present the appropriate host application workspaces, information and instructions on the display screen of the contact center agent;

executing one or more listeners, each of said listeners comprising a software object for collecting data, wherein each of said listeners is installed at a contact center system component that is capable of generating data and wherein each of said listeners gathers data generated by the respective system component as the data is created and passes said gathered data to an activity to which the listener is linked;

wherein the pre-programmed executable interaction workflow comprises a sequence of a plurality of activities;

wherein each of the plurality of activities is a software object that is stored in the memory and performs at least one task comprising: gathering information, handling information, handling an interrupt, executing decisional logic, or presenting a screen pop on the computer display of the contact center agent;

wherein at least one of the plurality of activities is linked to a customer relationship management (CRM) database comprising at least one item of CRM data, and said at least one of the plurality of activities enables presentation of the item of CRM data on the computer display of the contact center agent and further enables the contact center agent to edit the item of CRM data;

wherein the executing of the executable interaction workflow by the runtime environment presents, on the display screen of the contact center agent, an application workspace with information collected by at least one of the listeners that is linked to one of the activities;

wherein the executing of the executable interaction workflow by the runtime environment presents, on the display screen of the contact center agent, information about the customer from a database;

wherein the executing of the executable interaction workflow by the runtime environment presents, on the display screen of the contact center agent, prompts for the contact center agent to take one or more actions comprising: reading a script, gathering information from the customer or providing information to the customer.

* * * * *